(12) United States Patent
Min et al.

(10) Patent No.: US 12,282,203 B2
(45) Date of Patent: Apr. 22, 2025

(54) LENS DRIVING DEVICE, CAMERA MODULE, AND OPTICAL INSTRUMENT

(71) Applicant: LG INNOTEK CO., LTD., Seoul (KR)

(72) Inventors: Sang Jun Min, Seoul (KR); Tae Jin Jung, Seoul (KR); Kyoung Ho Yoo, Seoul (KR); Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 534 days.

(21) Appl. No.: 17/671,343

(22) Filed: Feb. 14, 2022

(65) Prior Publication Data

US 2022/0163755 A1     May 26, 2022

Related U.S. Application Data

(63) Continuation of application No. 16/477,448, filed as application No. PCT/KR2018/001883 on Feb. 13, 2018, now Pat. No. 11,275,229.

(30) Foreign Application Priority Data

Feb. 24, 2017    (KR) ........................ 10-2017-0025073
Feb. 24, 2017    (KR) ........................ 10-2017-0025078
(Continued)

(51) Int. Cl.
*G02B 7/09*         (2021.01)
*G02B 27/64*       (2006.01)
(Continued)

(52) U.S. Cl.
CPC ............. *G02B 7/09* (2013.01); *G02B 27/646* (2013.01); *G03B 5/04* (2013.01); *G03B 13/36* (2013.01);
(Continued)

(58) Field of Classification Search
CPC ........ G02B 7/09; G02B 27/646; H02K 11/21; H02K 5/24; H02K 41/0356; G03B 5/04; G03B 13/36
See application file for complete search history.

(56) References Cited

U.S. PATENT DOCUMENTS 9,618,768 B2 *   4/2017   Yeo ........................... G02B 7/09
9,720,204 B2 *   8/2017   Yoo ..................... G02B 27/0006
(Continued)

FOREIGN PATENT DOCUMENTS

CN         103543573 A     1/2014
CN         103792763 A     5/2014
(Continued)

OTHER PUBLICATIONS

Machine translation of KR 20170126165 retrieved electronically from Espacenet Jul. 18, 2024 (Year: 2024).*
(Continued)

*Primary Examiner* — Cara E Rakowski
(74) *Attorney, Agent, or Firm* — Birch, Stewart, Kolasch & Birch, LLP

(57) ABSTRACT

The present embodiment relates to a lens driving device including: a first movable element including a bobbin and a first coil; a second movable element including a housing and a first magnet; a base disposed below the housing; a board including a circuit member having a second coil; an upper elastic member; and a support member, wherein the bobbin includes a first stopper and a second stopper, which overlap the second movable element in an optical axis direction and are spaced apart from each other, the housing includes side parts and corner parts formed between the side parts, a first stopper is disposed on the side of the corner parts, the second stopper is disposed on the side of the side parts, and the distance between the first stopper and the second movable element in the optical axis direction is different from the (Continued)

distance between the second stopper and the second movable element in the optical axis direction.

20 Claims, 19 Drawing Sheets

(30) Foreign Application Priority Data

| Feb. 24, 2017 | (KR) | ........................ 10-2017-0025080 |
| Feb. 24, 2017 | (KR) | ........................ 10-2017-0025082 |
| Feb. 27, 2017 | (KR) | ........................ 10-2017-0025290 |

(51) Int. Cl.
| *G03B 5/04* | (2021.01) |
| *G03B 13/36* | (2021.01) |
| *H02K 5/24* | (2006.01) |
| *H02K 11/21* | (2016.01) |
| *H02K 41/035* | (2006.01) |

(52) U.S. Cl.
CPC .............. *H02K 5/24* (2013.01); *H02K 11/21* (2016.01); *H02K 41/0356* (2013.01); *G03B 2205/0015* (2013.01); *G03B 2205/0069* (2013.01)

(56) References Cited

U.S. PATENT DOCUMENTS

| 9,766,476 | B2* | 9/2017 | Yeo | ........................ G02B 7/08 |
| 9,829,673 | B2* | 11/2017 | Shin | ........................ G03B 3/10 |
| 9,921,388 | B2* | 3/2018 | Park | ........................ G02B 27/646 |
| 9,977,219 | B2* | 5/2018 | Cho | ........................ G02B 27/646 |
| 10,268,047 | B2* | 4/2019 | Yeo | ........................ G02B 7/02 |
| 10,284,787 | B2* | 5/2019 | Park | ........................ H04N 23/75 |
| 10,386,596 | B2* | 8/2019 | Shin | ........................ G02B 7/09 |
| 10,502,924 | B2* | 12/2019 | Lee | ........................ H04N 23/54 |
| 10,531,012 | B2* | 1/2020 | Park | ........................ G02B 27/646 |
| 10,551,588 | B2* | 2/2020 | Jung | ........................ G02B 7/08 |
| 10,574,868 | B2* | 2/2020 | Kim | ........................ G03B 5/00 |
| 10,578,829 | B2* | 3/2020 | Lee | ........................ G03B 5/00 |
| 10,598,954 | B2* | 3/2020 | Yeo | ........................ G02B 7/09 |
| 10,768,437 | B2* | 9/2020 | Park | ........................ G03B 5/00 |
| 10,830,980 | B2* | 11/2020 | Park | ........................ H02K 1/17 |
| 10,845,566 | B2* | 11/2020 | Shin | ........................ H04N 23/51 |
| 10,845,567 | B2* | 11/2020 | Shin | ........................ G02B 7/08 |
| 10,983,303 | B2* | 4/2021 | Jung | ........................ G01B 11/30 |
| 11,181,806 | B2* | 11/2021 | Kim | ........................ H04N 23/55 |
| 11,194,121 | B2* | 12/2021 | Lee | ........................ G02B 7/09 |
| 11,199,723 | B2* | 12/2021 | Yeo | ........................ G03B 5/00 |
| 11,239,024 | B2* | 2/2022 | Lee | ........................ H04N 23/51 |
| 11,275,229 | B2* | 3/2022 | Min | ........................ H02K 41/0356 |
| 11,347,023 | B2* | 5/2022 | Shin | ........................ H04N 23/51 |
| 11,442,241 | B2* | 9/2022 | Jung | ........................ H02K 33/16 |
| 11,567,286 | B2* | 1/2023 | Han | ........................ G03B 17/12 |
| 11,619,798 | B2* | 4/2023 | Park | ........................ G02B 7/02 |
| | | | | 359/642 |
| 11,619,801 | B2* | 4/2023 | Shin | ........................ H04N 23/57 |
| | | | | 359/557 |
| 11,653,103 | B2* | 5/2023 | Park | ........................ G02B 27/646 |
| | | | | 348/335 |
| 11,714,255 | B2* | 8/2023 | Lee | ........................ G02B 7/08 |
| | | | | 348/374 |
| 11,754,802 | B2* | 9/2023 | Kim | ........................ H04N 23/54 |
| | | | | 348/208.11 |
| 11,762,215 | B2* | 9/2023 | Park | ........................ G03B 3/10 |
| | | | | 359/554 |
| 11,803,028 | B2* | 10/2023 | Jung | ........................ H02K 33/16 |
| 11,803,029 | B2* | 10/2023 | Shin | ........................ G02B 7/08 |
| 11,899,271 | B2* | 2/2024 | Cho | ........................ G02B 27/646 |
| 11,914,171 | B2* | 2/2024 | Yeo | ........................ G02B 7/09 |
| 11,982,869 | B2* | 5/2024 | Jung | ........................ G02B 26/085 |
| 2014/0355120 | A1 | 12/2014 | Yeo | |
| 2015/0022992 | A1 | 1/2015 | Kaimoto | |
| 2015/0253583 | A1 | 9/2015 | Cho et al. | |
| 2016/0048033 | A1 | 2/2016 | Kim et al. | |
| 2016/0209621 | A1* | 7/2016 | Park | ........................ G02B 7/08 |
| 2017/0052342 | A1 | 2/2017 | Shin et al. | |
| 2017/0115466 | A1 | 4/2017 | Murakami et al. | |

FOREIGN PATENT DOCUMENTS

| CN | 104216199 A | 12/2014 | |
| CN | 104902149 A | 9/2015 | |
| CN | 105372785 A | 3/2016 | |
| CN | 105807538 A | 7/2016 | |
| CN | 105988177 A | 10/2016 | |
| JP | 2012-32607 A | 2/2012 | |
| KR | 10-2007-0103555 A | 10/2007 | |
| KR | 10-2015-0051772 A | 5/2015 | |
| KR | 10-2015-0108107 A | 9/2015 | |
| KR | 10-2015-0123004 A | 11/2015 | |
| KR | 10-2016-0057722 A | 5/2016 | |
| KR | 10-2016-0089703 A | 7/2016 | |
| KR | 10-2016-0118837 A | 10/2016 | |
| KR | 20170126165 A * | 11/2017 | .............. G02B 7/09 |
| WO | WO 2017/018727 A1 | 2/2017 | |
| WO | WO-2017179845 A1 * | 10/2017 | .......... G02B 13/001 |

OTHER PUBLICATIONS

Machine translation of KR 20160089703 retrieved electronically from Espacenet Jul. 17, 2024 (Year: 2024).*
Machine translation of WO-2017179845-A1 retrieved electronically from PE2E Search Dec. 9, 2024 (Year: 2024).*

* cited by examiner

LENS DRIVING DEVICE, CAMERA MODULE, AND OPTICAL INSTRUMENT

CROSS REFERENCE TO RELATED APPLICATIONS

This application is a Continuation of U.S. application Ser. No. 16/477,448, filed on Jul. 11, 2019, which is the National Phase of PCT International Application No. PCT/KR2018/001883, filed on Feb. 13, 2018, which claims priority under 35 U.S.C. 119(a) to Patent Application No. 10-2017-0025073, filed in the Republic of Korea on Feb. 24, 2017, Patent Application No. 10-2017-0025078, filed in the Republic of Korea on Feb. 24, 2017, Patent Application No. 10-2017-0025080, filed in the Republic of Korea on Feb. 24, 2017, Patent Application No. 10-2017-0025082, filed in the Republic of Korea on Feb. 24, 2017 and Patent Application No. 10-2017-0025290, filed in the Republic of Korea on Feb. 27, 2017, all of which are hereby expressly incorporated by reference into the present application.

TECHNICAL FIELD

This embodiment relates to a lens driving device, a camera module, and an optical instrument.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals.

A camera module is one of the representative items that capture a subject in a picture or a video. Meantime, the camera module is recently applied with an AF (Auto Focus) function that automatically adjusts a focus in response to a distance to a subject. In addition, the camera module is recently applied with an OIS (Optical Image Stabilization) function that prevents a phenomenon in which an image is shaken by trembling of a photographer's hands.

On the other hands, the conventional camera module suffers from disadvantages in which a stopper of a bobbin is damaged by being hit to a housing in the midst of reliability test.

Moreover, the conventional camera module also suffers from disadvantages in that there is a difficulty in coating a damper on a support member at a predetermined amount and the coated damper is feared to be lost.

Furthermore, the conventional camera module also suffers from disadvantages in that a shape design is required in order to have elasticity that requires an elastic member elastically connecting a bobbin relative to a housing.

Furthermore, the conventional camera module also suffers from disadvantages in that there is generated a push-back (being-pushed) and rotation of a cover member.

Still furthermore, the conventional camera module also suffers from disadvantages in that flux is evaporated into air to allow not-cured solder balls to be scattered to all directions about a sensor board in the course of the sensor board being coupled to an upper elastic member, which results in a serious problem because the scattering of not-cured solder balls becomes a fundamental cause of generating a solder foreign object during a shock reliance test.

DETAILED DESCRIPTION OF THE INVENTION

Technical Subject

The present exemplary embodiment is to provide a lens driving device, configured to disperse and distribute the shock or impact generated from a stopper during reliance test.

The present exemplary embodiment is to provide a lens driving device, configured to coat a damper at a predetermined amount and to prevent the coated damper from being lost.

The present exemplary embodiment is to provide a lens driving device, configured to include an elastic member having an elasticity required to elastically support a bobbin that performs movement relative to a housing for AF driving.

The present exemplary embodiment is to provide a lens driving device, configured to prevent a resonance of an elastic member.

The present exemplary embodiment is to provide a lens driving device, configured to prevent rotation of an elastic member.

The present exemplary embodiment is to provide a lens driving device, configured to prevent a push-back and rotation of cover member.

The present exemplary embodiment is to provide a lens driving device, configured to include a pocket structure capable of collecting solder balls that couple a sensor board and an upper elastic member.

Furthermore, the present exemplary embodiment is to provide a camera module including a lens driving device and an optical instrument.

Technical Solution

In the present exemplary embodiment, a stopper of a bobbin may doubly formed to distribute and disperse a shock generated from the stopper during reliability test.

A lens driving device according to an exemplary embodiment of present invention comprises: a first mover including a bobbin and a first coil disposed on the bobbin; a second mover including a housing disposed outside of the bobbin and a first magnet disposed at the housing to face the first coil; a base disposed below the housing; a board including a circuit member having a second coil interposed between the housing and the base to face the first magnet; an upper elastic member disposed at an upper side of the bobbin to be coupled to the bobbin and the housing; and a support member coupled to the upper elastic member and the board, wherein the bobbin includes a first stopper and a second stopper, which overlap the second mover in an optical axis direction and are spaced apart from each other, the housing includes lateral parts and corner parts formed between the lateral parts, a first stopper is disposed on the side of the corner parts, the second stopper is disposed on the side of the lateral parts, and a distance between the first stopper and the second mover in the optical axis direction is different from a distance between the second stopper and the second mover in the optical axis direction.

A distance between the first stopper and the housing in the optical axis direction may be longer than a distance between the second stopper and the first magnet in the optical axis direction.

A distance between the first stopper and the housing in the optical axis direction may be shorter than a distance between the second stopper and the first magnet in the optical axis direction.

The lens driving device may further comprise: a second magnet disposed on the bobbin; and a sensor disposed on the housing to detect the second magnet, wherein the corner part may include, to a clockwise direction, a first corner part, a second corner part, a third corner part and a fourth corner part, and wherein the second magnet may be disposed on the first corner part and the first stopper may be disposed at the second corner part and the fourth corner part.

The lens driving device may further comprise a third magnet disposed on the bobbin to be on an opposite side of the second magnet, and the third magnet may be disposed on the third corner part.

The second stopper may include a body part protruded from an outside of the bobbin to a direction perpendicular to the optical axis direction, and a protruding part protruded from a lower surface of the body part to the optical axis direction, wherein the protruding part may be overlapped with the first magnet in the optical axis direction, and the protruding part may include an area where a distance from an outside of the bobbin to an outside of the protruding part to a direction perpendicular to the optical axis direction is shorter than a distance from an outside of the bobbin to an outside of the body part.

A lower surface of second stopper may be disposed on a side upper than a lower surface of the first stopper.

A portion of the lower surface of the first stopper may be brought into contact with the coil.

The lower surface of the first stopper may be overlapped with an upper surface of a protruding part of the housing to the optical axis direction, and an upper surface of the protruding part at the housing may include a groove disposed at an area corresponding to an outer distal end of the first stopper.

The lens driving device may further comprise a cover member accommodated at an inside of the housing to be coupled with the base, wherein the bobbin may further include a third stopper protruded from an upper surface of the bobbin to be overlapped with the cover member to the optical axis direction.

A camera module according to an exemplary embodiment of the present invention comprises: a PCB (Printed Circuit Board); an image sensor disposed on the PCB; a first mover including a bobbin and a first coil disposed on the bobbin; a housing disposed at an outside of the bobbin; a second mover including a housing disposed at an outside of bobbin and a first magnet disposed at the housing to face the first coil; a base interposed between the housing and the PCB; a board including a circuit member having a second coil so disposed between the housing and the base as to face the first magnet; an upper elastic member disposed at an upper side of the bobbin to be coupled to the bobbin and the housing; and a support member coupled to the upper elastic member and the board, wherein the bobbin includes a first stopper and a second stopper overlapped with the second mover to an optical axis direction, each spaced apart, the housing includes lateral parts and corner parts formed between the lateral parts, the first stopper is disposed on the side of the corner parts, the second stopper is disposed on the side of the lateral parts, a lower surface of the first stopper includes a first groove overlapped with the second mover to the optical axis direction, or a lower surface of the second stopper includes a second groove overlapped with the second mover to the optical axis direction.

An optical instrument according to an exemplary embodiment of the present invention comprises a body part, a camera module disposed on the body part to capture an image of a subject, and a display part disposed on the body part to output the image of the subject captured by the camera module, wherein the camera module includes a PCB (Printed Circuit Board); an image sensor disposed on the PCB; a first mover including a bobbin and a first coil disposed on the bobbin; a housing disposed at an outside of the bobbin; a second mover including a housing disposed at an outside of bobbin and a first magnet disposed at the housing to face the first coil; a base interposed between the housing and the PCB; a board including a circuit member having a second coil so disposed between the housing and the base as to face the first magnet; an upper elastic member disposed at an upper side of the bobbin to be coupled to the bobbin and the housing; and a support member coupled to the upper elastic member and the board, wherein the bobbin includes a first stopper and a second stopper overlapped with the second mover to an optical axis direction, each spaced apart, the housing includes lateral parts and corner parts formed between the lateral parts, the first stopper is disposed on the side of the corner parts, the second stopper is disposed on the side of the lateral parts, and a distance between the first stopper and the second mover to the optical axis direction is different from a distance between the second stopper and the second mover to the optical axis direction.

A damper coated area according to an exemplary embodiment may be a support member, a coupled area between the upper elastic member and the support member, a housing and a leg part of the upper elastic member.

A lens driving device according to an exemplary embodiment of the present invention may include a damper groove accommodated by a damper.

A lens driving device according to an exemplary embodiment of the present invention comprises: a housing including an upper surface and an outer wall part; a bobbin so disposed at an inside of the housing as to move to a first direction; a first coil disposed on the bobbin; a first magnet disposed on the housing to face the first coil; a base disposed at a lower side of the housing; a board including a circuit member having a second coil disposed between the housing and the base to face the first magnet; an upper elastic member disposed at an upper side of the bobbin to be coupled to the bobbin and the housing; and a support member coupled to the upper elastic member and the board, wherein the upper elastic member includes an outer part coupled to the housing, a coupling part coupled to the support member, and a leg part connecting the outer part and the coupling part, the housing includes a damper groove disposed with a damper at an area corresponding to the leg part and the coupling part in an upper surface of the housing, the damper groove includes a first groove corresponding to the leg part, and a second groove corresponding to the coupling part, the first groove is connected to the second groove, a distance from an upper surface of the outer wall part to a floor surface of the second groove is greater than a distance from the upper surface of the outer wall part to a floor surface of the first groove, and a portion of the outer wall part at the housing form a first lateral wall of the first groove and the second groove.

The damper groove may further include a third groove connected to the second groove, and a portion of the outer wall at the housing may form a second lateral wall for the second groove and the third groove.

At least one lateral wall of the first lateral wall and the second lateral wall may include a fourth groove.

The fourth groove may be disposed between the first groove and the second groove, or may be disposed between the second groove and the third groove.

The first groove and the third groove may be disposed at an upper surface of the second groove.

The damper may be disposed on the damper groove to wrap the support member, the coupling part and the leg part.

The damper may be disposed on an area exceeding 50% of an entire area of a lower surface at the leg part.

The housing may include first to fourth corner parts formed on first to fourth lateral parts and formed among the first to fourth lateral parts, the support member may include a first support part disposed on the first corner part, the upper elastic member may include a plurality of elastic units, each spaced apart, and the plurality of elastic units may include a first elastic unit electrically connected to the first support part, the first elastic unit may include a first outer part coupled to a lateral part of one side at the housing, a second outer part coupled to a lateral part adjacent to a lateral part of one side at the housing, a first coupling part coupled to the support member, a first leg part connected to the first outer part and the first coupling part, and a second leg part connecting the second outer part and the first coupling part, and the first leg part and the second leg part may be oppositely disposed about the first coupling part.

Each of the first leg part and the second leg part may be bent or curved at least more than twice.

A camera module according to an exemplary embodiment of the present invention comprises: a PCB (Printed Circuit Board); an image sensor disposed on the PCB; a housing including an upper surface and an outer wall part; a bobbin disposed at an inside of the housing to move to a first direction; a first coil disposed on the bobbin; a first magnet disposed on the housing to face the first coil; a base interposed between the housing and the PCB; a board including a circuit member having a second coil so disposed between the housing and the base as to face the first magnet; an upper elastic member disposed at an upper side of the bobbin to be coupled to the bobbin and the housing; and a support member coupled to the upper elastic member and the board, wherein the support member includes a first wire and a second wire disposed at a first corner of the housing, each spaced apart, the upper elastic member include a first elastic unit coupled to the first wire, and a second elastic unit coupled to the second wire, the first elastic unit includes a first outer part coupled to the housing, a first coupling part coupled to the first wire, and a first leg part connecting the first outer part and the first coupling part, the second elastic unit includes a second outer part coupled to the housing, a second coupling part coupled to the second wire, and a second leg part connecting the second outer part and the second coupling part, the housing includes a damper groove disposed with a damper, the damper groove includes a first groove disposed on the first coupling part, a second groove disposed on the second coupling part and a third groove interposed between the first groove and the second groove, a portion of the outer part at the housing forms a first lateral wall for the first groove and the second groove, and a second lateral wall for the second groove and the third groove.

An optical instrument according to an exemplary embodiment of the present invention comprises a body part, a camera module disposed on the body part to capture an image of a subject, and a display part disposed on the body part to output the image of the subject captured by the camera module, wherein the camera module includes a PCB (Printed Circuit Board); an image sensor disposed on the PCB; a housing including an upper surface and an outer wall part; a bobbin disposed at an inside of the housing to move to a first direction; a first coil dispose on the bobbin; a first magnet disposed on the housing to face the first coil; a base interposed between the housing and the PCB; a board including a circuit member having a second coil so disposed between the housing and the base as to face the first magnet; an upper elastic member disposed at an upper side of the bobbin to be coupled to the bobbin and the housing; and a support member coupled to the upper elastic member and the board, wherein the upper elastic member include an outer part coupled to the housing, a coupling part coupled to the support member, and a leg part connecting the outer part and the coupling part, the housing includes a damper groove disposed with a damper at an area corresponding to the leg part and the coupling part in an upper surface of the housing, the damper groove include a first groove corresponding to the leg part and a second groove corresponding to the coupling part, the first groove is connected to the second groove, and a distance from an upper surface of the outer wall to a floor surface of the second groove is greater than a distance from the upper surface of the outer part to a first floor surface of the first groove, and a portion of the outer part at the housing forms a first lateral wall for the first groove and the second groove.

A lens driving device according to an exemplary embodiment of the present invention comprises: a housing; a bobbin including a lug at an upper surface to allow being moved to a first direction at an inside of the housing; a first coil disposed on the bobbin; a first magnet disposed on the housing to face the first coil; a base disposed at a lower side of the housing; a board including a circuit member having a second coil so disposed between the housing and the base as to face the first magnet; an upper elastic member disposed at an upper side of the bobbin to be coupled to the bobbin and the housing; and a support member coupled to the upper elastic member and the board, and a damper interposed between the bobbin and the upper elastic member, wherein the upper elastic member includes a first elastic unit, a second elastic unit, a third elastic unit and a fourth elastic unit, each spaced apart and coupled to the bobbin, and each of the first to fourth elastic units includes first to fourth inner parts coupled to the bobbin, and each of the first to fourth inner parts include at least more than two holes coupled to the lug of the bobbin.

The lug of bobbin may include a first lug coupled to the first inner part and a second lug, the first inner part may include a first hole and a second hole, the first hole of the first inner part may be coupled to the first lug of bobbin and the second hole of the first inner part may be coupled to the second lug of bobbin.

The first hole of the first inner part may be greater than the second hole.

The first lug of bobbin may be bonded to the first hole of the first inner part of bobbin using an adhesive, and the first hole of the first inner part may include a plurality of grooves disposed with the adhesive.

The first elastic unit may further include a first outer part coupled to the housing and a first connection part connecting the first outer part and the first inner part, and the first hole of the inner part may be closer in distance to the first connection part than the second hole.

The first lug of the bobbin and the second lug may guide a position of the first elastic unit.

The first connection part may include a damper disposition part disposed with the damper.

A first inner portion and a second inner portion may be disposed between the first inner part and the damper disposition part, each facing the other, and each bent or curved for a plurality of times.

The first inner portion and the second inner portion may be extended to a direction different from an extension direction of the adjacently disposed outer part.

A diameter of the second lug may be smaller than a diameter of the first lug, and the first lug may be coupled to the first hole by fusion, and the inner part may further include a groove formed by being extended from the first hole to allow a portion of the first lug to be accommodated.

The bobbin may further include a protruding part at an area corresponding to that of the damper disposition part protruding from an upper surface of the bobbin, and the damper may be disposed on the protruding part and the damper disposition part, and the damper disposition part may be spaced apart from the protruding part to be disposed at an inside of the protruding part.

A lens driving device according to an exemplary embodiment of the present invention comprises: a housing; a bobbin disposed at an inside of the housing to be moved to a first direction; a first coil disposed on the bobbin; a first magnet disposed on the housing to face the first coil; a base including a first lug disposed on a first side surface and a second lug disposed on a second side surface opposite to the first side surface; a board disposed between the housing and the base to include a circuit member having a second coil to face the first magnet; and a cover member accommodating the housing at an inside to be coupled with the base, wherein, the first lug and the second lug may be protruded from an outside of the base, the board may include a first terminal part disposed at a first side surface of the base, and a second terminal part disposed at a second side surface of the base, the cover member may include an upper plate disposed on an upper side of the housing and a side plate extended from the upper plate to be coupled with the base, the side plate may include a first side plate disposed on the first side surface of the base, and a second side plate disposed on the second side surface of the base, the first side plate may include a first groove part disposed at an area corresponding to that of the first terminal part and concavely formed from a lower surface of the first side plate, the second side plate may include a second groove part disposed at an area corresponding to that of the second terminal part and concavely formed from a lower surface of the second side plate, the first groove part may include a first surface formed at a side upper than a lower surface of the side plate, and a first connection surface connecting the lower surface of the side plate and the first surface, the second groove part may include a second surface formed at a side upper than a lower surface of the side plate, and a second connection surface connecting the lower surface of the side plate and the second surface, the first lug may support the first surface and the first connection surface, and the second lug may support the second surface and the second connection surface.

The first lug may be interposed between the first terminal part and the first connection surface, and the second lug may be interposed between the second terminal part and the second connection surface.

The second lug may be disposed at an opposite side of the first lug about an optical axis.

The first lug may be disposed on a first corner part of the base, and the second lug may be disposed on a second corner part opposite to the first corner part.

The first lug may include an upper surface corresponding to the first surface, and a first side surface corresponding to the first connection surface, and the second lug may include an upper surface corresponding to the second surface, and a second side surface corresponding to the second connection surface.

The first lug may include a third side surface corresponding to a side surface of the first terminal part, and the second lug may include a fourth side surface corresponding to a side surface of the second terminal part.

The base may further include a third lug disposed on the first side surface of base and disposed on the second corner part adjacent to the first corner part, and the first groove part of the first side plate may further include a third connection surface disposed opposite to the first connection surface, and the third lug may support the first surface and the third connection surface.

The base may further include a fourth lug disposed on the second side surface of base and disposed on a fourth corner part adjacent to the first corner part, the second groove part of the second side plate may further include a fourth connection surface disposed opposite to the second connection surface, and the fourth lug may support the second surface and the fourth connection surface.

The lens driving device may further comprise: an upper elastic member disposed on an upper side of bobbin and coupled to the bobbin and the housing; and a support member coupled to the upper elastic member and the board, wherein the base may further include an opening so formed as to allow an area coupled by the board and the support member to be opened, and wherein the opening may be disposed with a protruding part protruded from the base and supporting an inner surface of the cover member.

The base may further include a staircase part protruded from an outside of the base to support a lower end of the side plate, and an upper surface of the first lug and the second lug may be dispose at an area upper than an upper surface of the staircase part to support the first surface of the first side plate and the second surface of the second side plate.

The first lug and the second lug may include a slant surface slantingly connecting an outside of the first lug and the second lug and an outside of the base.

The present exemplary embodiment may include a pocket structure configured to capture solder balls during soldering operations for assembly of a sensor board attached by a Hall sensor with a housing.

The pocket structure according to an exemplary embodiment may accommodate bonds coated on a sensor board for being assembled on a housing.

The bond may be coated on a soldered area and an upper side of pocket after soldering operations.

A lens driving device according to an exemplary embodiment of the present invention comprises: a housing; a bobbin disposed at an inside of the housing to be moved to a first direction; a first coil disposed on the bobbin; a first magnet disposed on the housing to face the first coil; a base disposed at a lower side of the housing; a first board disposed between the housing and the base to include a circuit member having a second coil so disposed as to face the first magnet; an upper elastic member disposed at an upper side of housing to be coupled to the bobbin and the housing; a support member coupled with the upper elastic member and the first board; a second magnet disposed on the bobbin; a second board disposed on the housing; and a sensor detecting the second magnet by being coupled to the second board, wherein the second board is coupled to the upper elastic member and the coupling member, and the housing includes a pocket part disposed on the corner part of housing and the pocket part is overlapped with the coupling member to an optical axis direction.

The pocket part may include a first wall and a second wall, and the second board may be coupled with the first wall and may be spaced apart from the second wall.

The pocket part may include a first pocket part and a second pocket part disposed at a lower side of the first pocket part, and an opening of the first pocket part may be disposed on an upper surface of housing.

A length of the first pocket part to a major axis direction may be greater than a length of the second pocket part to a major axis direction.

The second board may be coupled to the housing using an adhesive, and at least a portion of the adhesive may be accommodated into the pocket part.

The coupling member may include a solder, and at least a portion of the solder may be accommodated into the pocket part.

The coupling member may further include an adhesive disposed at an upper side of the solder.

The housing may include a sensor reception groove formed by allowing a portion of an upper surface at the first wall to accommodate at least a portion of the sensor.

The second wall may include a groove part.

The upper elastic member may include four (4) upper elastic units coupled to the second board and spaced apart from each other, the second board may include four (4) terminals for supplying an outside power to the sensor, wherein each of the four terminals may be coupled to each of four upper elastic units using a solder.

The upper elastic member may include four (4) pocket parts disposed on an area corresponding to the four terminals.

The second board may be perpendicularly disposed with the upper elastic member, and the upper elastic member may further include a groove part formed at an area disposed with the coupling member.

A camera module according to an exemplary embodiment of the present invention comprises: a PCB; an image sensor disposed on the PCB; a housing; a bobbin disposed at an inside of the housing to be moved to an optical axis direction; a first coil disposed on the bobbin; a first magnet disposed on the housing to face the first coil; a base interposed between the housing and the PCB; a first board disposed between the housing and the base to include a circuit member having a second coil to face the first magnet; an upper elastic member disposed at an upper side of housing to be coupled to the bobbin and the housing; a support member coupled to the upper elastic member and the first board; a second magnet disposed on the bobbin; a second board disposed on the housing; and a sensor coupled to the second board to detect the second magnet, the second board is coupled to the upper elastic member using a coupling member, the housing includes a pocket part disposed on the second board, the pocket part is overlapped with the coupling member to an optical axis direction, and the second board may be overlapped with the pocket part to a direction perpendicular to the optical axis direction.

An optical instrument according to an exemplary embodiment comprises: a body part, a camera module disposed on the body part to capture an image of a subject, and a display part disposed on the body part to output the image of the subject captured by the camera module, wherein the camera module includes a PCB (Printed Circuit Board); an image sensor disposed on the PCB; a housing; a bobbin disposed at an inside of the housing to move to a first direction; a first coil dispose on the bobbin; a first magnet disposed on the housing to face the first coil; a base interposed between the housing and the PCB; a first board including a circuit member having a second coil so disposed between the housing and the base as to face the first magnet; an upper elastic member disposed at an upper side of the bobbin to be coupled to the bobbin and the housing; a support member coupled to the upper elastic member and the first board; a second magnet disposed on the bobbin; a second board disposed on the housing; and a sensor coupled to the second board to detect the second magnet, wherein the second board is coupled to the upper elastic member and a coupling member, the housing includes a pocket part disposed on a corner part of the housing and the pocket part is overlapped with the coupling member to an optical axis direction.

Advantageous Effects

The phenomenon of a stopper of a bobbin being damaged during a reliability test can be prevented through an exemplary embodiment of the present invention.

A damper groove is formed to allow coating a damper at a predetermined amount and there is no fear of the coated damper from being lost according to an exemplary embodiment of the present invention.

Stress generated from an elastic member can be removed according to an exemplary embodiment of the present invention, through which the phenomenon of resonance generated from an elastic member can be prevented according to the exemplary embodiment of the present invention.

Moreover, rotation of elastic member can be prevented in an exemplary embodiment of the present invention.

Push-over and rotation of an OIS cover member can be prevented in an exemplary embodiment of the present invention, through which an OIS stroke can be obtained and a leaned stroke can be improved.

Solder balls can be collected through an exemplary embodiment of the present invention.

Furthermore, bonds for assembly of a sensor board are not overflowed according to an exemplary embodiment of the present invention.

In addition, solder balls collected in a pocket may not be escaped to an outside.

BEST MODE

Figure 1:
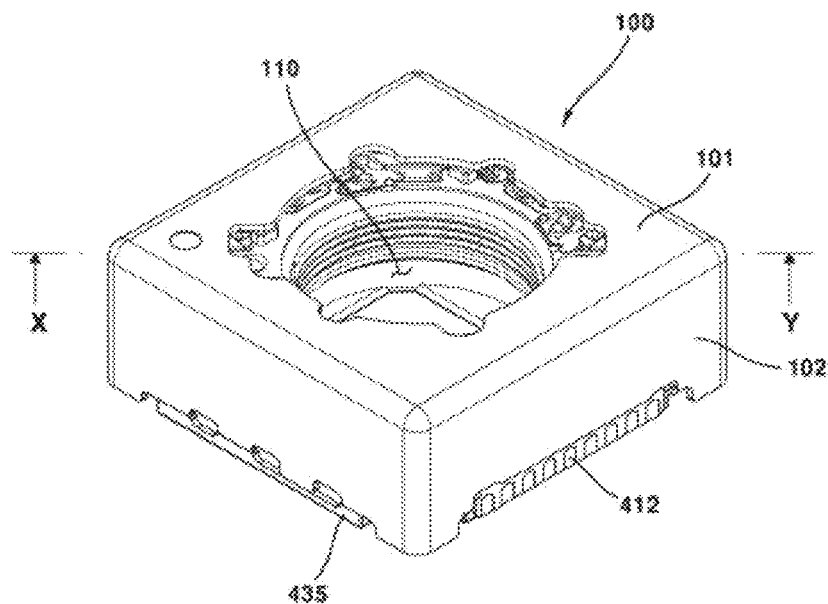
FIG. 1 is a perspective view of a lens driving device according to an exemplary embodiment of the present invention.

Some exemplary embodiments of present invention will be described in detail with reference to the accompanying drawings. In describing a reference numeral for each element, a same reference numeral will be designated, if possible, for the same element, albeit being differently indicated on other drawings.

In describing elements in the exemplary embodiments of the present invention, the terms of first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

The hereinafter-used term of "optical axis direction" may be defined as an optical axis direction of a lens module coupled to a lens drive device. Meantime, the "optical axis direction" may be interchangeably used with a vertical direction, a z axis direction and other directions.

The term of 'auto focus function' used hereinafter may be defined as a function of automatically matching a focus of a subject by adjusting a distance to an image sensor by moving a lens module to an optical axis direction according to a distance to the subject in order to obtain a clear image of the subject from an image sensor. Meantime, the "auto focus" may be interchangeably used with an "AF (Auto Focus)".

The term of 'handshake correction function' used hereinafter may be defined as a function of moving or tilting a lens module to a direction perpendicular to an optical axis in order to offset a vibration (movement) generated by an external force on an image sensor. Meantime, the 'handshake correction' may be interchangeably used with the 'OIS (Optical Image Stabilization)'.

Hereinafter, any one of an AF driving coil (220), a driving magnet (320) and an OIS driving coil (422) may be called a 'first driving part' and another may be called a 'second driving part' and still another may be called a 'third driving part'. Meantime, the AF driving coil (220), the driving magnet (320) and the OIS driving coil (422) may be interchangeably disposed by being mutually changed in positions thereof.

Hereinafter, any one of the AF driving coil (220) and the OIS driving coil (422) may be called a 'first coil' and the other may be called a 'second coil'.

Hereinafter, any one of a driving magnet (320), a sensing magnet (730) and a compensation magnet (740) may be called a 'first magnet', another may be called a 'second magnet' and the still another may be called a 'third magnet'.

Hereinafter, any one of a board (410) of a stator (400) and a board (720) of a first sensing unit (700) may be called a 'first board' and another may be called a 'second board'.

Hereinafter, a configuration of an optical instrument according to an exemplary embodiment of the present invention will be described.

The optical instrument may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may include any device capable of capturing an image or a photograph.

The optical instrument may include a main body (not shown), a camera module and a display part (not shown). However, any one or more of the main body, the camera module and the display part may be omitted or changed.

The main body may form an external shape of an optical instrument. The main body may include a cubic shape, for example. In another example, the main body may be at least partially rounded. The main body may accommodate a camera module. One surface of a main body may be disposed with a display part. One surface of main body may be disposed with a display part and a camera module, and the other surface of the main body (surface opposite to the said one surface) may be additionally disposed with a camera module.

The camera module may be disposed on the main body. The camera module may be disposed on one surface of main body. The camera module may be partially accommodated into the main body. The camera module may be formed in a plural number. The plurality of camera modules may be respectively disposed on one surface and on the other surface of the main body. The camera module may capture an image of a subject.

The display part may be disposed on the main body. The display part may be disposed on one surface of main body. That is, the display part may be disposed on a same surface as that of the camera module. Alternatively, the display part may be disposed at the other surface of main body. The display part may be disposed on a surface disposed at an opposite surface of a surface disposed with the camera module. The display part may output an image captured by the camera module.

Hereinafter, configuration of a camera module according to an exemplary embodiment of the present invention will be described with reference to the accompanying drawings.

The camera module may comprise a lens driving device, a lens module (not shown), an infrared filter (not shown), a PCB (not shown), an image sensor (not shown) and a controller (not shown). However, any one or more of the lens driving device, the lens module, the infrared filter, the PCB, the image sensor and the controller may be omitted or changed from the camera module.

The lens module may include at least one lens. The lens module may include a lens and a lens barrel. The lens module may include one or more lenses (not shown) and a lens barrel accommodating the lens. However, one element of the lens module is not limited to the lens barrel, and any holder structure capable of supporting one or more lenses may suffice for a lens module. The lens module may be coupled to an inside of the lens driving device. The lens module may be coupled to a bobbin (210) of the lens driving device. The lens module may integrally move with the bobbin (210). The lens module may be coupled to the bobbin (210) by way of an adhesive (not shown). For example, the lens module may be screw-connected to the bobbin (210). Meantime, a light having passed the lens module may be irradiated on an image sensor.

The infrared filter may shield a light of infrared region from being incident on an image sensor. The infrared filter may be interposed between the lens module and the image sensor. For example, the infrared filter may be disposed on a holder member (not shown) separately disposed from a base (430). In another example, the infrared filter may be mounted on a through hole (431) of the base (430). The infrared filter may be formed with a film material or a glass material. The infrared filter may be formed by allowing an infrared cut-off coating material to be coated on a plate-shaped optical filter such as an imaging plane protection cover glass or a cover glass. For example, the infrared filter may be an infrared absorption filter (blue filter) absorbing the infrared. In another example, the infrared filter may be an infrared reflection filter (IR cut-off filter) reflecting the infrared.

A lens driving device may be disposed on an upper surface of a PCB. The PCB may be disposed at a lower surface of the lens driving device. The PCB may be coupled with the lens driving device. The PCB may be disposed with an image sensor. The PCB may be electrically connected to an image sensor. For example, a holder member may be interposed between the PCB and the lens driving device. At this time, an inside of the holder member may accommodate the image sensor. In other example, The PCB may be directly disposed with the lens driving device. At this time, an inside of the lens driving device may accommodate the image sensor. Through this structure, a light having passed the lens module coupled to the lens driving device may be irradiated on an image sensor. The PCB may supply a power (current) to the lens driving device. Meantime, the PCB may be disposed with a controller for controlling the lens drive device.

The image sensor may be disposed on the PCB. The image sensor may be electrically connected to the PCB. For example, the image sensor may be coupled to the PCB by way of SMT (Surface Mounting Technology) method. In another example, the image sensor may be coupled to the PCB by way of flip chip technology. The image sensor may be so disposed as to match the lens module by way of optical axis. In other words, an optical axis of the image sensor and an optical axis of the lens module may be aligned, through which the image sensor can obtain a light having passed the lens module. The image sensor may convert a light irradiated on an effective image region to an electric signal. The image sensor may be a CCD (Charge Coupled Device), a MOS (Metal Oxide Semi-Conductor), a CPD and a CID. However, the types of image sensor are not limited thereto, and any structure capable of converting an incident light to an electric signal may be included.

The controller may be mounted on the PCB. For example, the controller may be disposed at an inside of the lens driving device. In another example, the controller may be disposed on an outside of the lens driving device. The controller may individually control a direction, intensity and an amplitude of a current supplied to the AF driving coil (220) and the OIS driving coil (422) of the lens driving device. The controller may perform any one or more of an AF function and an OIS function of the camera module by controlling the lens driving device. That is, the controller may move or tilt the lens module to an optical axis direction or to a direction perpendicular to the optical axis direction by controlling the lens driving device. Furthermore the controller may perform any one or more of the feedback control of the AF function and a feedback control of the OIS function. To be more specific, the controller may receive a position of a bobbin (210) or a housing (310) detected by a first sensor unit (700) to perform an AF feedback control by controlling a current applied to the AF driving coil (220). Furthermore, the controller may receive a position of a bobbin (210) or a housing (310) detected by a second sensor (800) to perform an OIS feedback control by controlling a current applied to the OIS driving coil (422). The feedback controls by the controller thus mentioned may be generated in real time to allow performing a more accurate AF function and an OIS function.

Hereinafter, configuration of the lens drive device according to an exemplary embodiment of the present invention will be described with reference to the accompanying drawings.

Figure 2:
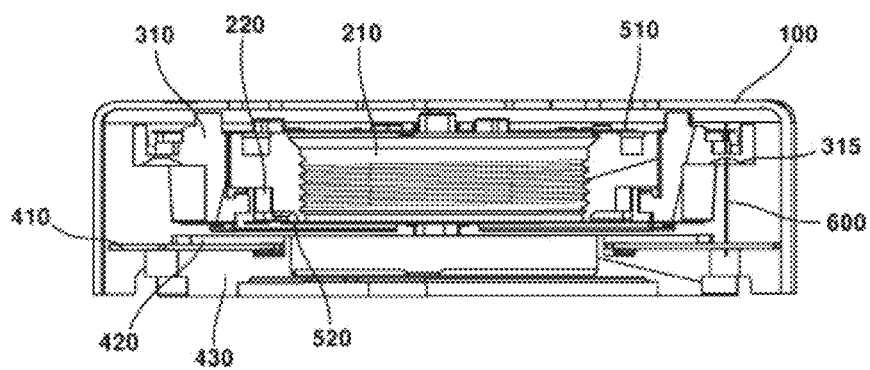
FIG. 2 is a cross-sectional view taken along X-Y of FIG. 1.
Figure 3:
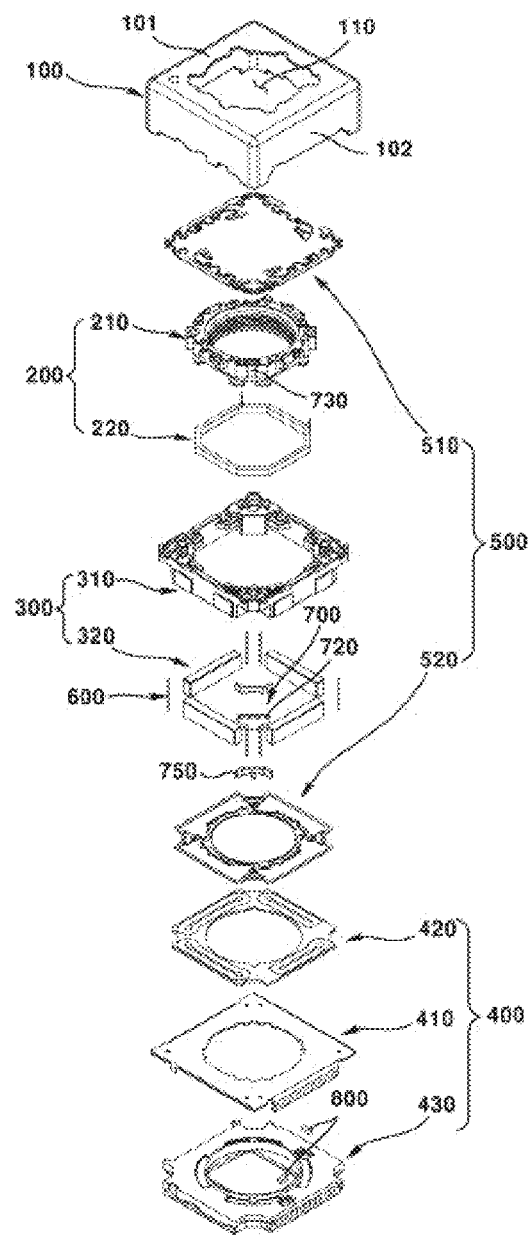
FIG. 3 is an exploded perspective view of a lens driving device according to an exemplary embodiment of the present invention.
Figure 4:
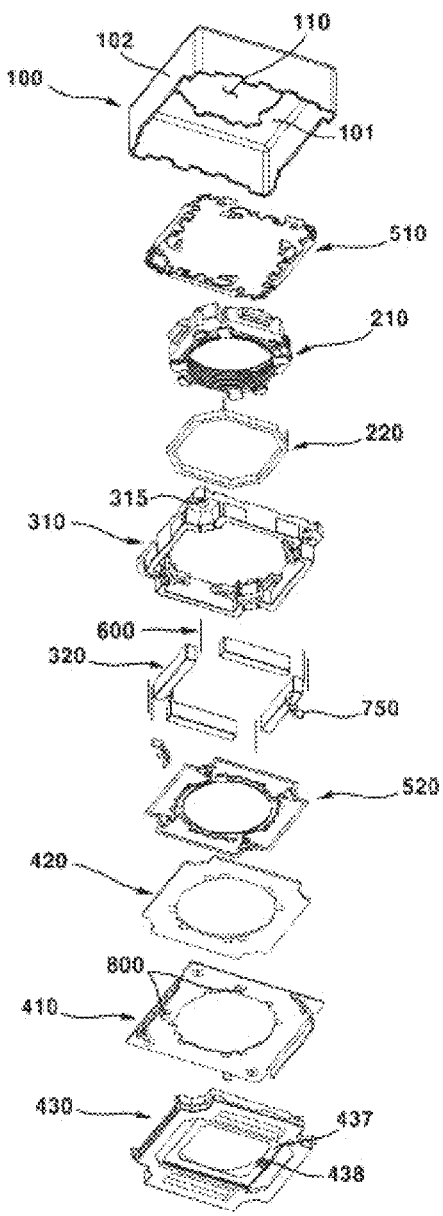
FIG. 4 is an exploded prospective view of a lens driving device taken along from a direction different from FIG. 3 according to an exemplary embodiment of the present invention.
Figure 5:
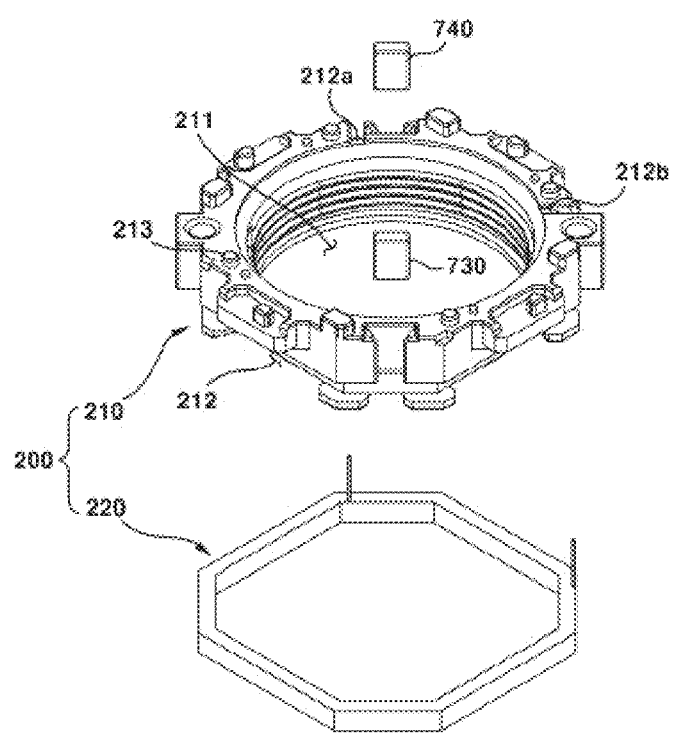
FIG. 5 is an exploded perspective view of a first mover and related elements according to an exemplary embodiment of the present invention.
Figure 6:
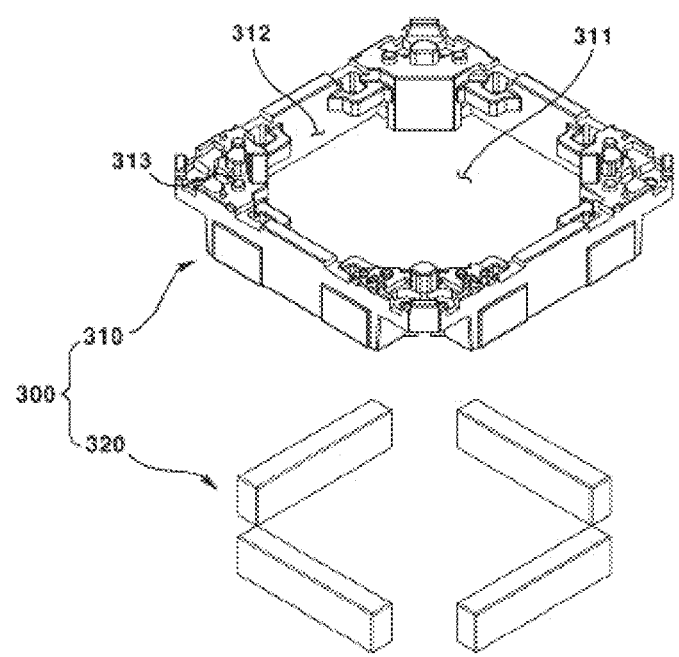
FIG. 6 is an exploded perspective view of a second mover according to an exemplary embodiment of the present invention.
Figure 7:
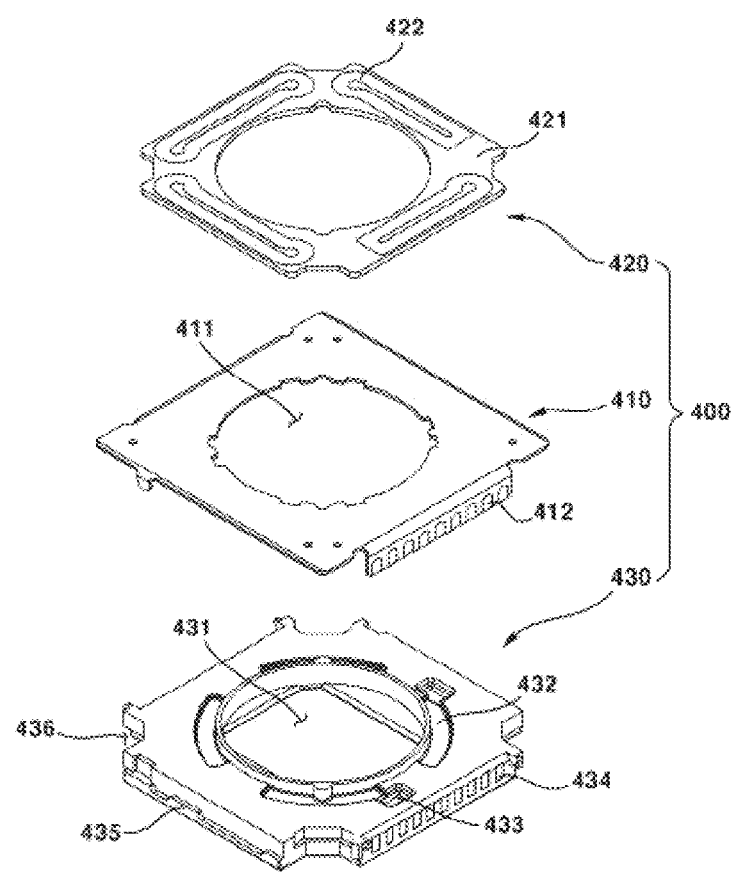
FIG. 7 is an exploded perspective view of a stator according to an exemplary embodiment of the present invention.
Figure 8:
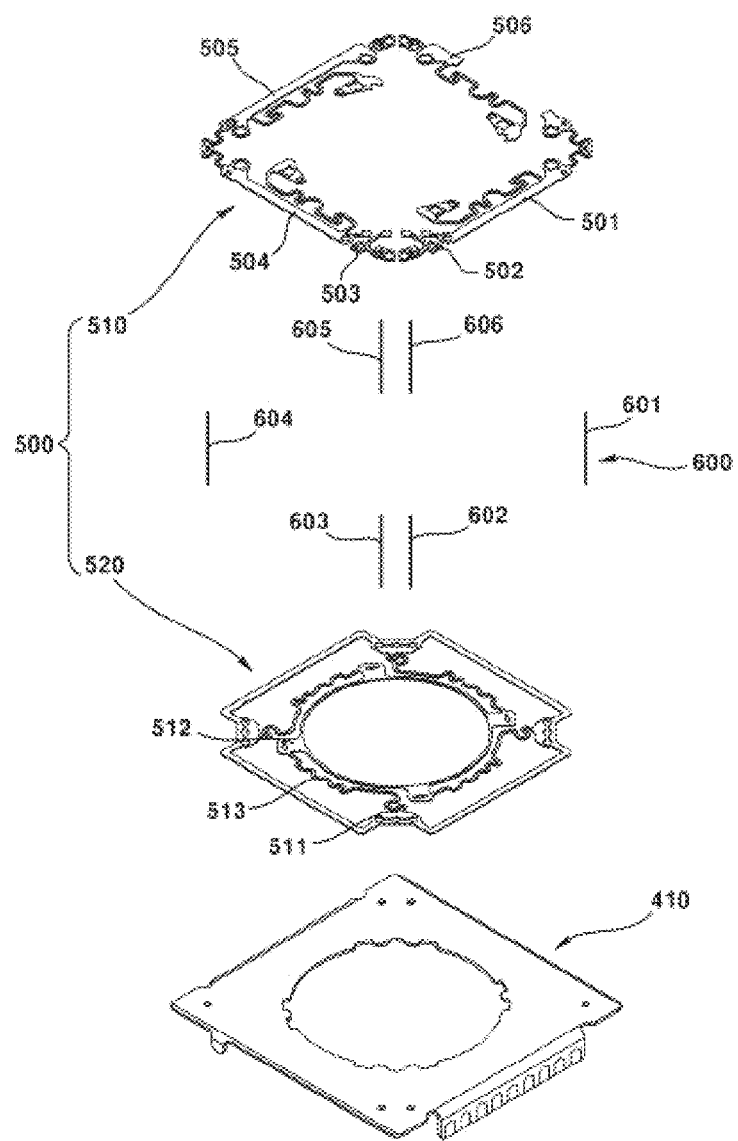
FIG. 8 is an exploded perspective view of an elastic member, a support member and related elements according to an exemplary embodiment of the present invention.
Figure 9:
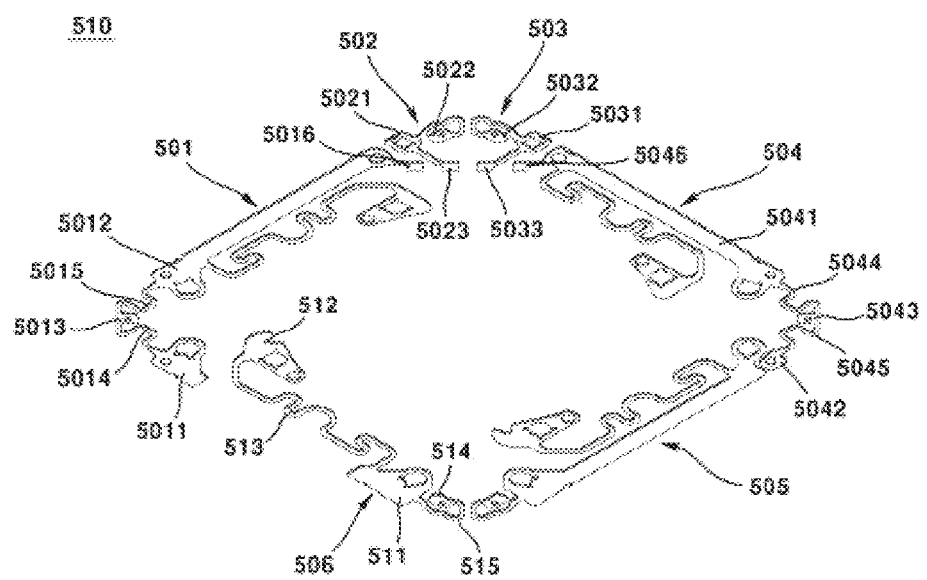
FIG. 9 is a perspective view of an upper elastic member according to an exemplary embodiment of the present invention.
Figure 10:
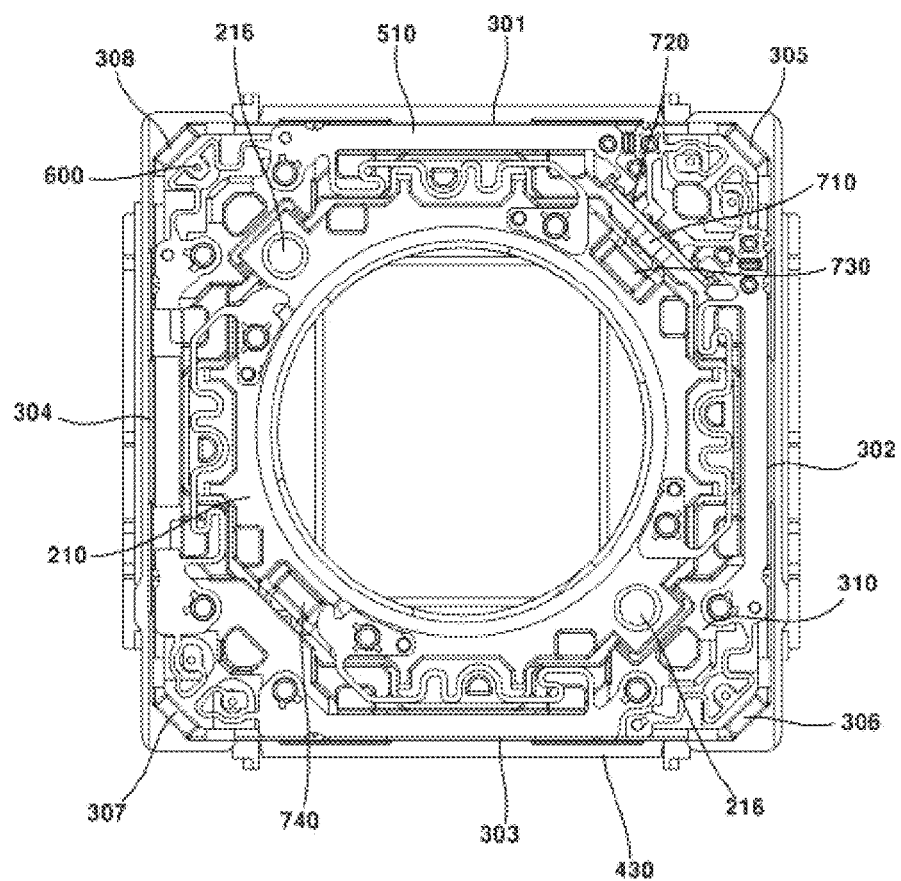
FIG. 10 is a plan view of a lens driving device removed of a cover member according to an exemplary embodiment of the present invention.
Figure 11:
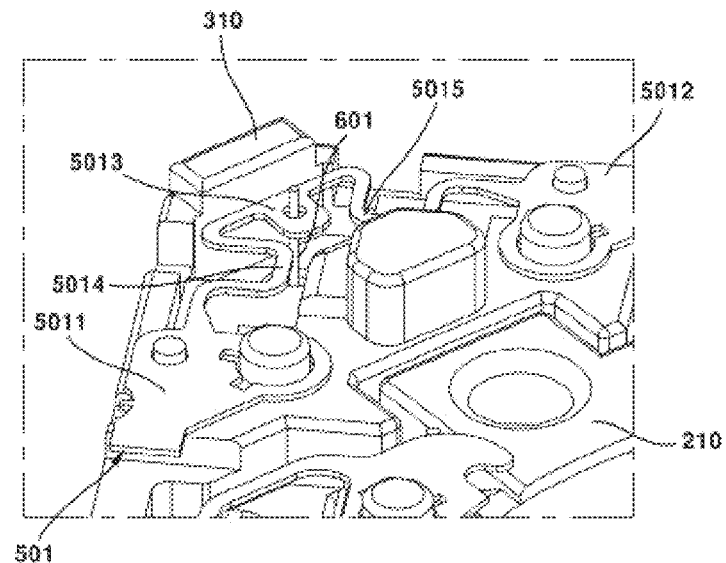
FIGS. 11 and 12 are enlarged perspective views of some portions in FIG. 10.
Figure 12:
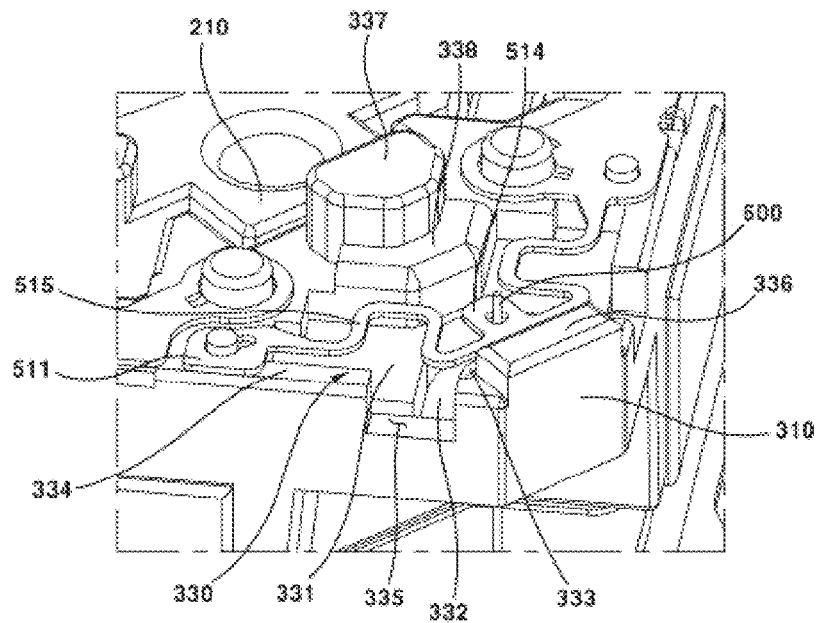
Figure 16:
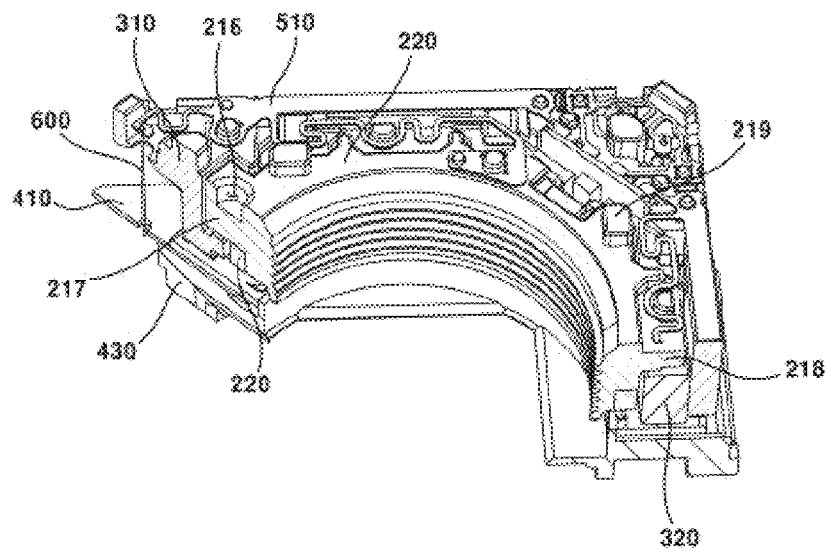
FIG. 16 is a perspective view of a lens driving device arbitrarily removed and cut off of a cover member according to an exemplary embodiment of the present invention.
Figure 17:
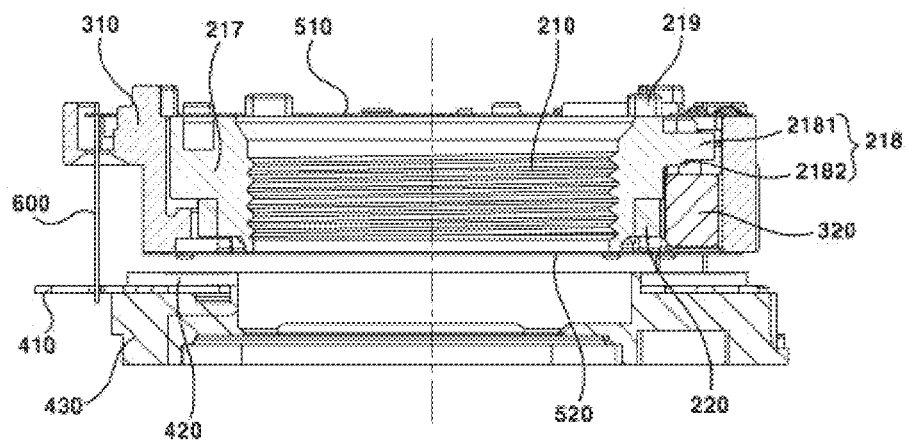
FIG. 17 is a lateral view taken from a lateral side of FIG. 16.
Figure 18:
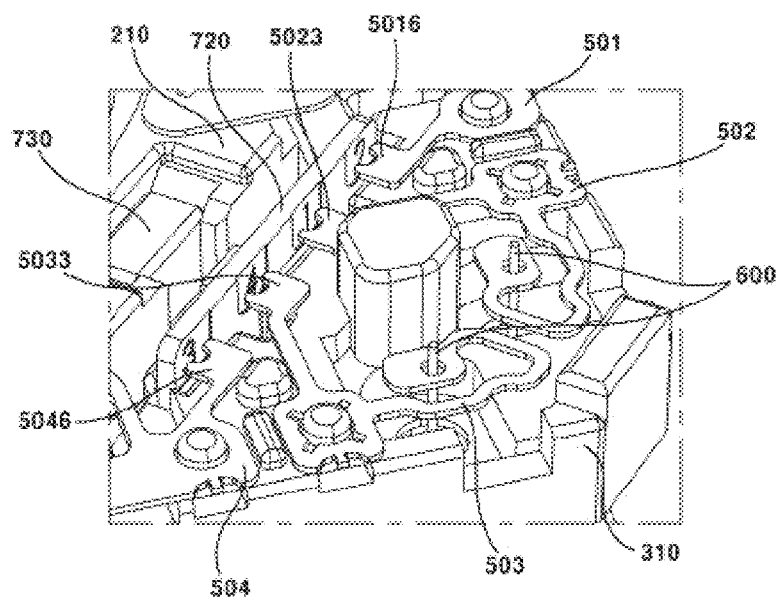
FIG. 18 is an enlarged perspective view of some portions of FIG. 10.
Figure 19:
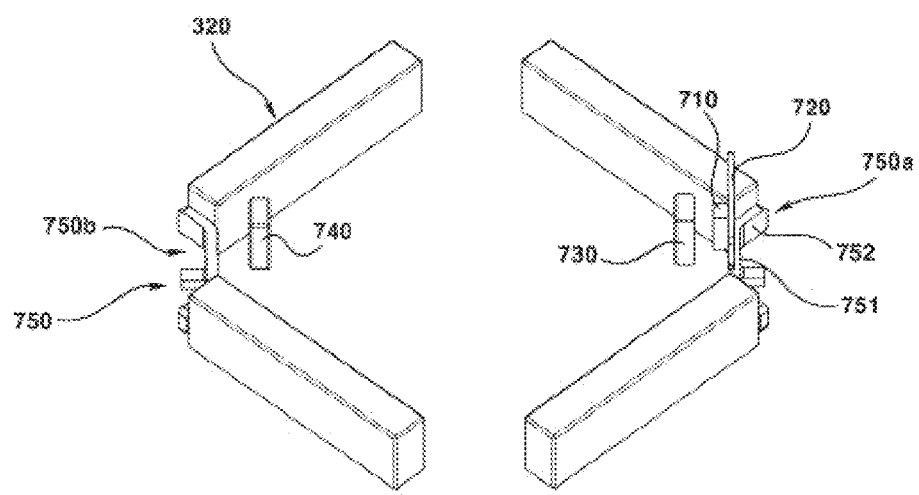
FIG. 19 is a perspective view of a driving magnet and a first sensing unit according to an exemplary embodiment of the present invention.
Figure 20:
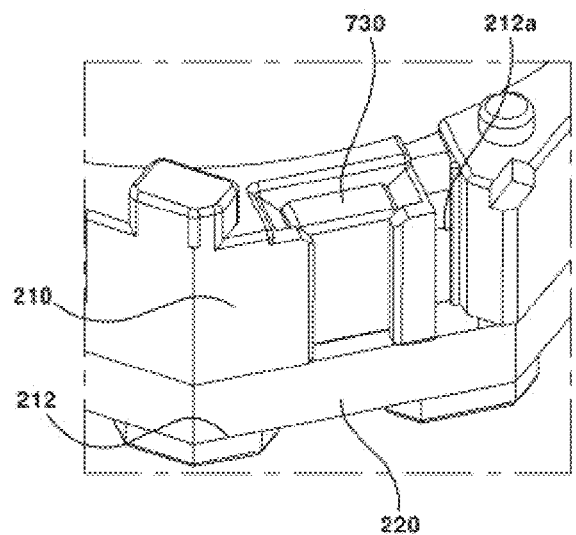
FIG. 20 is a perspective view of a bobbin, an AF driving coil and a sensing magnet according to an exemplary embodiment of the present invention.
Figure 21:
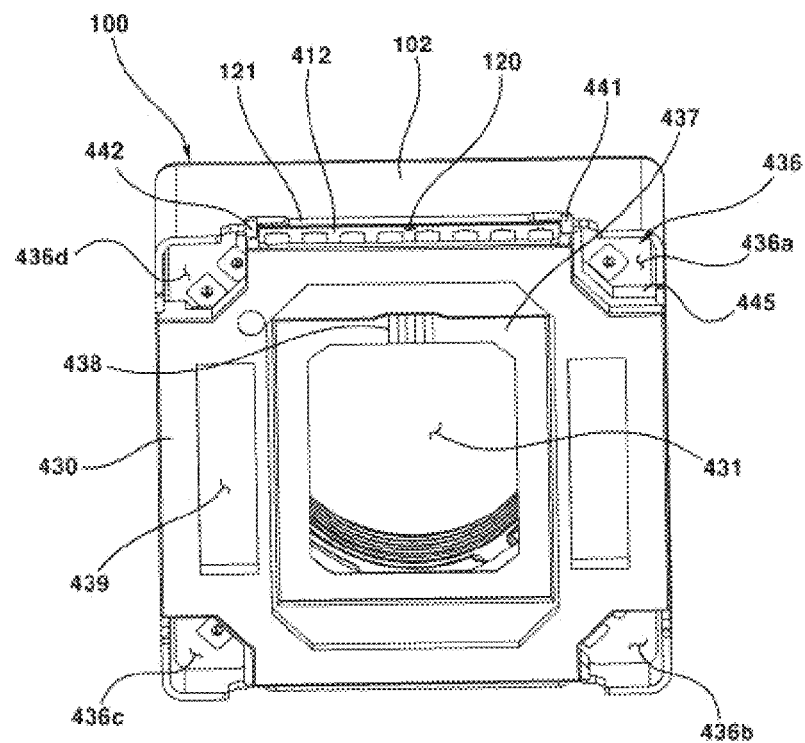
FIG. 21 is a bottom perspective view of a lens driving device according to an exemplary embodiment of the present invention.
Figure 22:
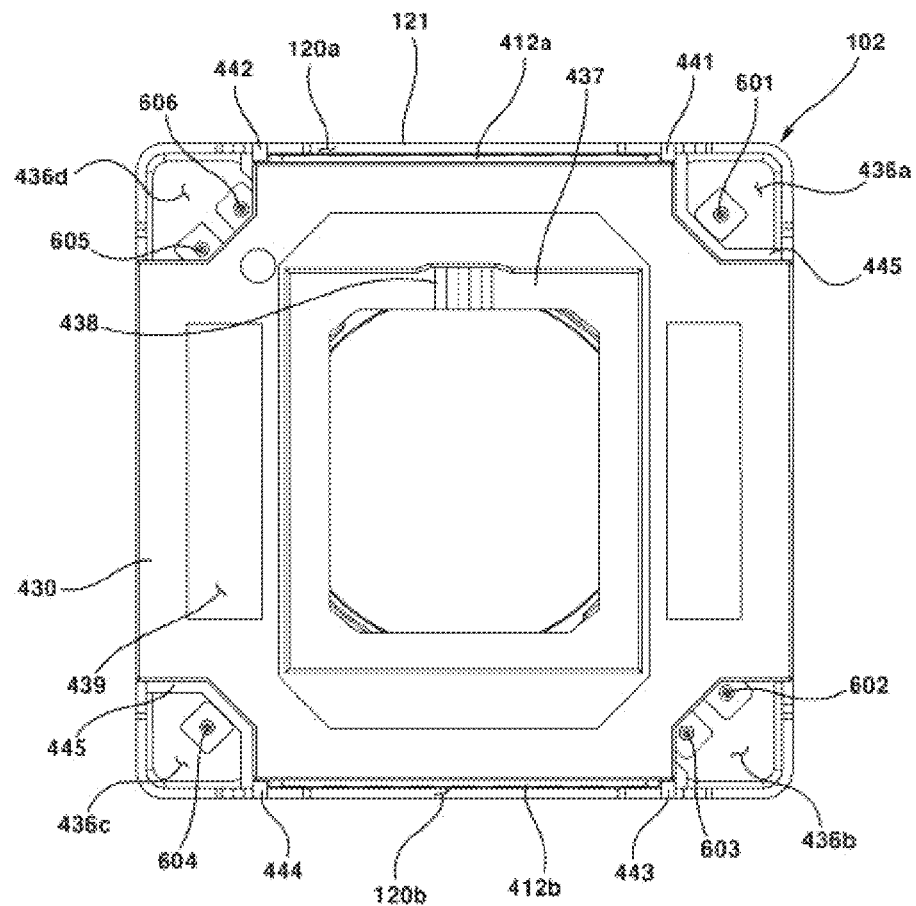
FIG. 22 is a bottom view of a lens driving device according to an exemplary embodiment of the present invention.
Figure 23:
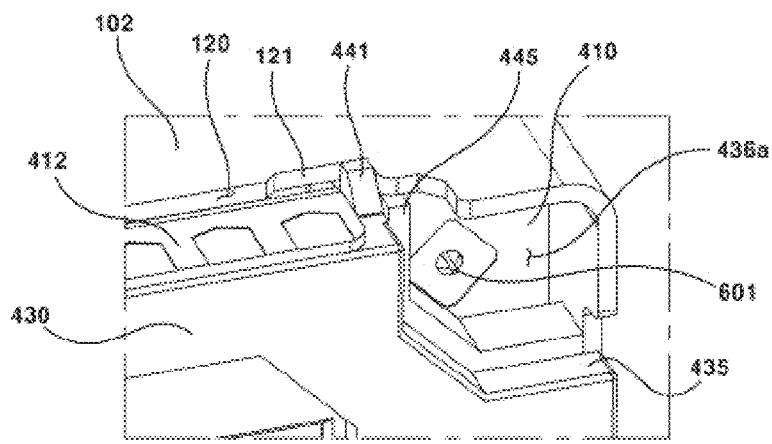
FIGS. 23 and 24 are enlarged bottom perspective views of some portions of FIG. 21.
Figure 24:
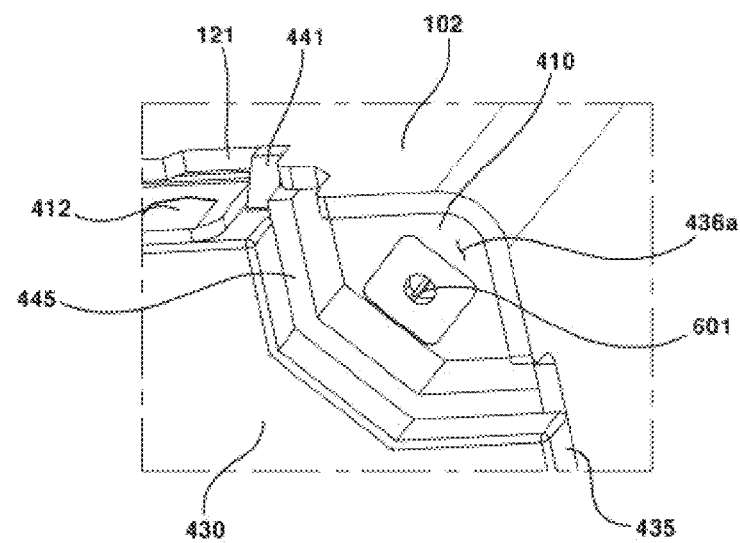
Figure 25:
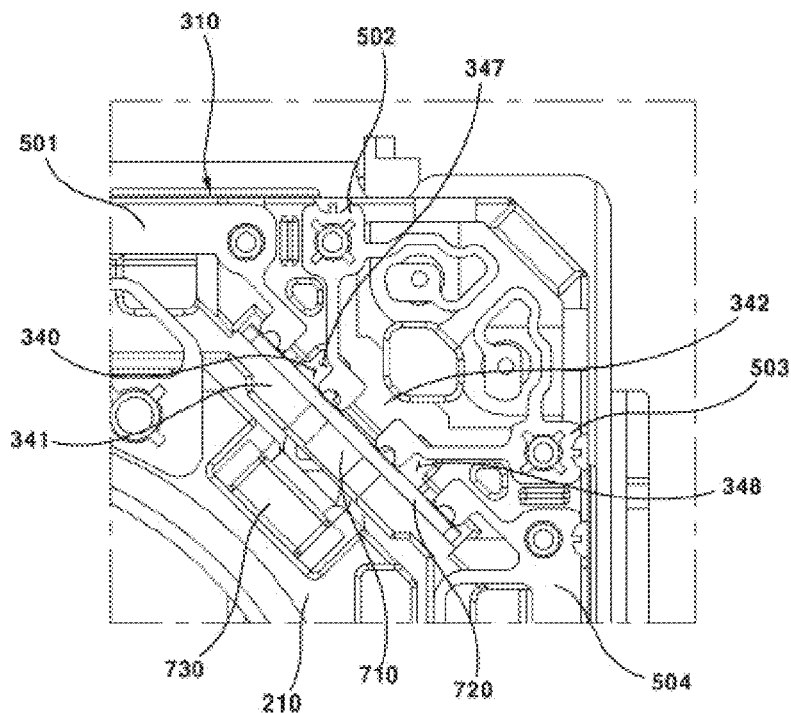
FIG. 25 is an enlarged plan view of some portions of FIG. 10.
Figure 26:
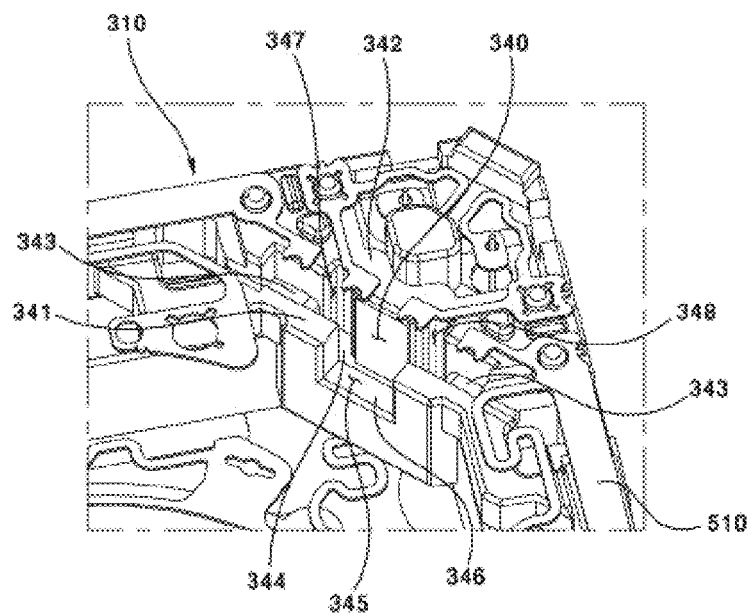
FIG. 26 is a perspective view where some portions of FIG. 25 are omitted.
Figure 27:
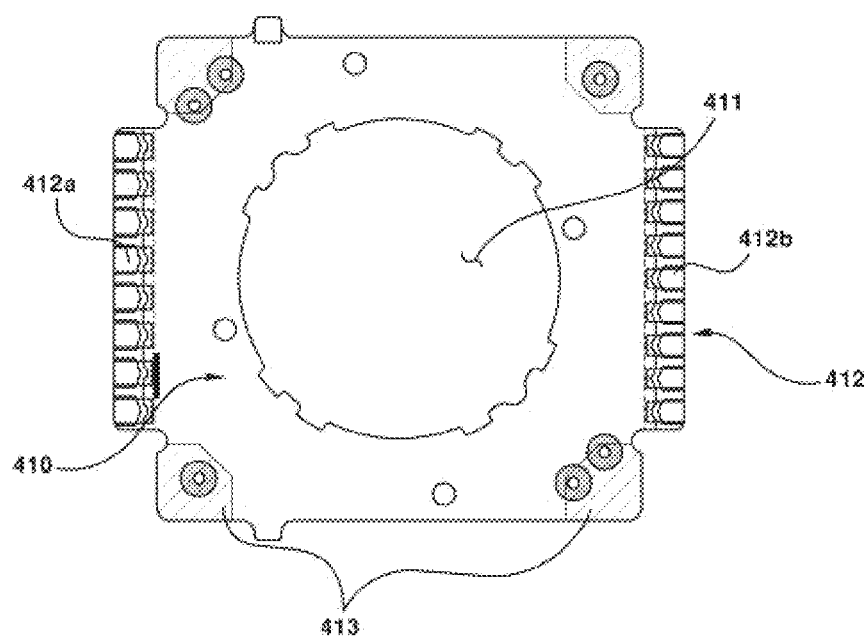
FIG. 27 is a plan view of a board of a stator according to an exemplary embodiment of the present invention.

FIG. 1 is a perspective view of a lens driving device according to an exemplary embodiment of the present invention, FIG. 2 is a cross-sectional view taken along X-Y of FIG. 1, FIG. 3 is an exploded perspective view of a lens driving device according to an exemplary embodiment of the present invention, FIG. 4 is an exploded prospective view of a lens driving device taken along from a direction different from FIG. 3 according to an exemplary embodiment of the present invention, FIG. 5 is an exploded perspective view of a first mover and related elements according to an exemplary embodiment of the present invention, FIG. 6 is an exploded perspective view of a second mover according to an exemplary embodiment of the present invention, FIG. 7 is an exploded perspective view of a stator according to an exemplary embodiment of the present invention, FIG. 8 is an exploded perspective view of an elastic member, a support member and related elements according to an exemplary embodiment of the present invention, FIG. 9 is a perspective view of an upper elastic member according to an exemplary embodiment of the present invention, FIG. 10 is a plan view of a lens driving device removed of a cover member according to an exemplary embodiment of the present invention, FIGS. 11 and 12 are enlarged perspective views of some portions in FIG. 10, FIGS. 13, 14 and 15 are enlarged plan views of some portions of FIG. 10, FIG. 16 is a perspective view of a lens driving device arbitrarily removed and cut off of a cover member according to an exemplary embodiment of the present invention, FIG. 17 is a lateral view taken from a lateral side of FIG. 16, FIG. 18 is an enlarged perspective view of some portions of FIG. 10, FIG. 19 is a perspective view of a driving magnet and a first sensing unit according to an exemplary embodiment of the present invention, FIG. 20 is a perspective view of a bobbin, an AF driving coil and a sensing magnet according to an exemplary embodiment of the present invention, FIG. 21 is a bottom perspective view of a lens driving device according to an exemplary embodiment of the present invention, FIG. 22 is a bottom view of a lens driving device according to an exemplary embodiment of the present invention, FIGS. 23 and 24 are enlarged bottom perspective views of some portions of FIG. 21, FIG. 25 is an enlarged plan view of some portions of FIG. 10, FIG. 26 is a perspective view where some portions of FIG. 25 are omitted, FIG. 27 is a plan view of a board of a stator according to an exemplary embodiment of the present invention.

The lens drive device may comprise a cover member (100), a first mover (200), a second mover (300), a stator (400), an elastic member (500), a support member (600), a first sensing unit (700), a second sensing unit (800) and a damper (910, 920). However, any one or more of the cover member (100), the first mover (200), the second mover (300), the stator (400), the elastic member (500), the support member (600), the first sensing unit (700), the second sensing unit (800) and the damper (910, 920) may be omitted or changed from the lens drive device. Particularly, any one or more of the first sensing unit (700) and the second sensing unit (800) may be omitted because of an element for AF feedback control and OIS feedback control.

The cover member (100) may be accommodated at an inside of a housing (310). The cover member (100) may be coupled with a base (430). The cover member (100) may form an external shape of the lens drive device. The cover member (100) may take a bottom-opened cubic shape. However, the present invention is not limited thereto. The cover member (100) may be of a non-magnetic substance. If the cover member (100) is formed with a magnetic substance, the magnetic force of the cover member (100) may affect any one or more of a driving magnet (320), a sensing magnet (730) and a compensation magnet (740). The cover member (100) may be formed with a metal material. To be more specific, the cover member (100) may be formed with a metal plate. In this case, the cover member (100) may shield an EMI (Electro Magnetic Interference). Because of the said characteristic of the cover member (100), the cover member (100) may be called an "EMI shield can". The cover member (100) may be connected to a ground part of a PCB (40), through which the cover member (100) can be grounded. The cover member (100) can shield radio waves generated from outside of the lens drive device from being introduced into the cover member (100). Furthermore, the cover member (100) can shield radio waves generated from inside of the cover member (100) from being discharged to outside of the cover member (100).

The cover member (100) may include an upper plate (101) and a side plate (102). The cover member (100) may include an upper plate (101) and a side plate (102) downwardly extended from an outer periphery of the upper plate (101). The upper plate (101) of cover member (100) may be disposed at an upper side of the housing (310). The side plate (102) of cover member (100) may be extended from the upper plate (101) to be coupled with the base (430). For example, the cover member (100) may be coupled to the base (430). A portion of the side plate (102) at the cover member (100) may be coupled to the base (430). A lower end of the side plate (102) of the cover member (100) may be coupled to a step (staircase, 435) of the base (430). An inner lateral surface of the side plate (102) of the cover member (100) may be directly contacted to an outside lateral surface of the base (430). An inner lateral surface of the side plate (102) at the cover member (100) may be coupled to the base (430) by an adhesive (not shown). In another example, the cover member (100) may be directly coupled to an upper surface of the PCB. An inner space formed by the cover member (100) and the base (430) may be disposed with a first mover (200), a second mover (300), a stator (400), an elastic member (500) and a support member (600). Through this structure, the cover member (100) can protect inner elements from an outside shock and simultaneously prevent an outside foreign contaminated object from being inwardly introduced.

The cover member (100) may include an opening (110) and a recessed part (120). However, any one of the opening (110) and the recessed part (120) may be omitted or changed from the cover member (100).

The opening (110) may be formed on the upper plate (101) of cover member (100). The opening (110) may upwardly expose a lens module. The opening (110) may take a shape corresponding to that of the lens module. The opening (110) may be greater in size than a diameter of lens module to allow the lens module to be assembled through the opening (110). A light having been introduced into and through the opening (110) may pass through the lens module. At this time, the light having passed the lens module may be converted to an electric signal by an image sensor and may be obtained as an image.

The recessed part (120) may be formed by allowing a lower surface of the side plate (102) of the cover member (100) to be recessed. A terminal part (412) of board (410) may be exposed through the recessed part (120). The recessed part (120) may be inserted by lugs (441, 442, 443, 444) of base (430). The recessed part (120) may include a first recessed part (120a) and a second recessed part (120b). The recessed part (120) may include a first recessed part (120a) formed at one outside surface of base (430) and a second recessed part (120b) formed at the other outside surface of base (430). A first terminal part (412a) may be exposed through the first recessed part (120a). A second terminal part (412b) may be exposed through the second recessed part (120b).

The recessed part (120) may include a recessed surface (121). The recessed part (120) may include a recessed surface (121) formed at an area upper than a lower surface of the side plate (102). The recessed part (120) may include a first connection surface and a second connection surface connecting a lower surface of side plate (102) and the recessed surface (121). The recesses surface (121) may be formed at an area upper than a lower surface of the side plate (102). The lower surface of the side plate (102) and the recessed surface (121) may be connected by the first connection surface and the second connection surface. The recessed surface (121) and the first connection surface may be supported by the first lug (441). The recessed surface (121) and the second connection surface may be supported by the second lug (442).

The first mover (200) may be coupled with a lens module, which is an element of camera module (but the lens module may be also explained as an element of lens driving device). The first mover (200) may be accommodated into an inside of the lens module. An inner periphery surface of first mover (200) may be coupled by an outer periphery surface of the lens module. The first mover (200) may be moved through interaction with the second mover (300) and/or the stator (400). At this time, the first mover (200) may move integrally with the lens module. The first mover (200) may move for AF focus function.

At this time, the first mover (200) may be called an 'AF mover'. However, it should be noted that the first mover (200) is not limited to a member moved only for the autofocus function. The first mover (200) may also be moved for the OIS function.

The first mover (200) may include a bobbin (210) and an AF driving coil (220). However, any one or more of the bobbin (210) and the AF driving coil (220) may be omitted or changed from the first mover (200).

The bobbin (210) may be disposed at an inside of the housing (310). The bobbin (210) may be disposed at a through hole (311) of the housing (310). The bobbin (210) may move to an optical axis direction about the housing (310). The bobbin (210) may be so disposed at an inside of the housing (310) as to move to a first direction. At this time, the first direction may be an optical axis direction. The bobbin (210) may be disposed on the through hole (311) to move along the optical axis direction. The bobbin (210) may be coupled with the lens module. An inner periphery surface of bobbin (210) may be coupled by an outer periphery surface of lens module. The bobbin (210) may be coupled by an AF driving coil (220). An outer periphery surface of bobbin (210) may be coupled by the AF driving coil (220). A lower surface of bobbin (210) may be coupled by a lower elastic member (520). An upper surface of bobbin (210) may be coupled by an upper elastic member (510).

The bobbin (210) in the present exemplary embodiment may be driven to bi-directional direction. That is, the bobbin (210) may selectively move to an upper side and a lower side along the optical axis. The bobbin (210) may move upwardly up to 210 μm~330 μm, and may move downwardly up to 20 μm~100 μm.

The bobbin (210) may include a through hole (211), a driving part coupling part (212), an upper coupling part (213) and a lower coupling part (214). The bobbin (210) may include a lug (215) and a jig groove (216). The bobbin (210) may include a first stopper (217), a second stopper (218) and a third stopper (219). However, any one or more of the through hole (211), the driving part coupling part (212), the upper coupling part (213) and the lower coupling part (214), the lug (215), the jig groove (216), the first stopper (217), the second stopper (218) and the third stopper (219) may be omitted or changed from the bobbin (210).

The through hole (211) may be disposed at an inside of the bobbin (210). The through hole (211) may be so formed as to be opened at an upper side and a bottom side. The through hole (211) may be coupled by a lens module. An inner periphery surface of the through hole (211) may be formed with a screw thread corresponding to that formed on an outer periphery surface of the lens module. That is, the through hole (211) may be screw-connected with the lens module. An adhesive may be interposed between the lens module and the bobbin (210). At this time, the adhesive may be an epoxy hardened by any one or more of UV, heat and laser.

The driving part coupling part (212) may be coupled by an AF driving coil (220). The driving part coupling part (212) may be formed on an outer periphery surface of bobbin (210). The driving part coupling part (212) may be formed by a groove formed by allowing a portion of the outer periphery surface of bobbin (210) to be inwardly recessed. At this time, the driving part coupling part (212) may be accommodated by at least a portion of the AF driving coil (220). The driving part coupling part (212) may be integrally formed with the outer periphery surface of bobbin (210). For example, the driving part coupling part (212) may be continuously formed along the outer periphery surface of bobbin (210). At this time, the driving part coupling part (212) may be wound with the AF driving coil (220). In another example, the driving part coupling part (212) may be formed in a plural number, each being mutually spaced apart. At this time the AF driving coil (220) may be also formed in a plural number to be respectively coupled to the driving part coupling part (212). In still another example, the driving part coupling part (212) may be formed with an upper side opened or a bottom side opened. At this time, the AF driving coil (220) may be inserted into and coupled with the driving part coupling part (212) through the opening in a pre-wound state.

The driving part coupling part (212) may include a first coil lead-out groove (212a) and a second coil lead-out groove (212b). The first coil lead-out groove (212a) and the second coil lead-out groove (212b) may be formed by allowing a portion of an upper surface of bobbin (210) to be recessed. The first coil lead-out groove (212a) and the second coil lead-out groove (212b) may be formed by allowing a portion of an outer periphery surface of bobbin (210) to be recessed. The first coil lead-out groove (212a) and the second coil lead-out groove (212b) may be mutually spaced apart. Each of the first coil lead-out groove (212a) and the second coil lead-out groove (212b) may be disposed with a lead cable. Both distal ends of the AF driving coil (220) may be coupled with the upper elastic member (510) through the first coil lead-out groove (212a) and the second coil lead-out groove (212b).

The upper coupling part (213) may be coupled with the upper elastic member (510). The upper coupling part (213) may be coupled with an inner part (512) of the upper elastic member (510). The upper coupling part (213) may be upwardly protruded from an upper surface of the bobbin (210). For example, a lug of the upper coupling part (213) may be coupled by being inserted into a groove or a hole of the inner part (512) of the upper elastic member (510). At this time, the lug of the upper coupling part (213) may be fused to a hole of the inner part (512) while being inserted into a hole of the inner part (512) to fix the upper elastic member (510) between the fused lug and an upper surface of bobbin (210).

The upper coupling part (213) may include a first lug (2131) and a second lug (2132). The first lug (2131) and the second lug (2132) may be mutually spaced apart. The first lug (2131) and the second lug (2132) may guide a position of the upper elastic member (510).

The first lug (2131) may be coupled to a first hole (5121). A diameter of the first lug (2131) may be greater than that of the second lug (2132). The first lug (2131) may be fused with the upper elastic member (510) through fusion, and through the said course of processes, a portion of the first lug (2131) may be accommodated into a guide hole (5123). Furthermore, the guide hole (5123) may be called a 'groove extended from the first hole (2131)'.

At least a portion of the second lug (2132) may be accommodated into the second hole (5122). A diameter of the second lug (2132) may be smaller than that of the first lug (2131). In the present exemplary embodiment, the inner part (512) of upper support member (510) can be prevented from rotating relative to the bobbin (210) by the dual coupling between a coupling between the first hole (5121)

and the first lug (2131) and a coupling between the second hole (5122) and the second lug (2132).

The lower coupling part may be coupled with the lower elastic member (520). The lower coupling part may be coupled with an inner part (522) of lower elastic member (520). The lower coupling part may be formed by being protruded from a lower surface of bobbin (210) to a lower side. For example, a lug of the lower coupling part may be coupled by being inserted into a groove of inner part (522) of lower elastic member (520) or a hole. At this time, the lug of the lower coupling part may be fused while being inserted into a hole of the inner part (522) to be fixed between the fused lug of lower elastic member (520) and a lower surface of bobbin (210). The lug (215) may be protruded from an upper surface of bobbin (210). The lug (215) may be disposed with a second damper (920). The lug (215) may be coated with the second damper (920). An inner side surface of lug (215) may be formed by a curved surface (2151). An outer side surface of lug (215) may be formed by a plain surface (2152).

The jig groove (216) may be formed on an upper surface of bobbin (210) by being recessed. The jig groove (216) may be used as a jig to graph the bobbin (210) in the assembly process of lens driving device. Particularly, the jig groove may be used to graph the bobbin (210) when the lens module is screw-connected to the bobbin (210) to thereby prevent the rotation of bobbin (210). The jig groove (216) may include a first groove and a second groove each formed in a mutually corresponding shape on an upper surface of opposite side. The first groove and the second groove may be formed on a mutually opposite side. The first groove and the second groove may be formed with a same shape. The first groove and the second groove may be formed by being spaced apart from a sensing magnet (730) and a compensation magnet (740). A virtual straight line connecting a center of first groove and a center of second groove may meet a virtual straight line connecting a center of the sensing magnet (730) and a center of the compensation magnet (740) on an optical axis. A virtual straight line connecting a center of first groove and a center of second groove may orthogonally meet a virtual straight line connecting a center of the sensing magnet (730) and a center of the compensation magnet (740).

A first stopper (217) and a second stopper (218) may be mutually spaced apart from each other. The first stopper (217) and the second stopper (218) may restrict a lower moving limitation of bobbin (210). That is, each of the first stopper (217) and the second stopper (218) may function as a lower side stopper for bobbin.

The first stopper (217) may be spaced apart from the second stopper (218). The first stopper (217) may be overlapped with the second mover (300) to an optical axis direction. The first stopper (217) may be overlapped with the housing (310) to an optical axis direction. At least a portion of first stopper (217) may be disposed on an upper side of housing (310). The first stopper (217) may be protruded from an outer periphery surface of bobbin (210). The first stopper (217) may be protruded from an outer lateral surface of bobbin (210). The first stopper (217) may be brought into contact with the housing (310) upon movement of bobbin (210). A portion of lower surface of first stopper (217) may be brought into contact with an AF driving coil (220). A portion of lower surface of first stopper (217) may be brought into surface-contact with an AF driving coil (220). A lower surface of first stopper (217) may be disposed at an area lower than a lower surface of second stopper (218).

The second stopper (218) may be spaced apart from the first stopper (217). The second stopper (218) may be overlapped with the second mover (300) to an optical axis direction. The second stopper (218) may be overlapped with the driving magnet (320) to an optical axis direction. The second stopper (218) may be overlapped with the housing (310) to an optical axis direction. The second stopper (218) may be protruded from an outer periphery surface of bobbin (210). The second stopper (218) may be protruded from an outer lateral surface of bobbin (210). The second stopper (218) may be brought into contact with the driving magnet (320) upon movement of bobbin (210). A lower surface of second stopper (218) may be disposed at an area upper than a lower surface of the first stopper (217).

In the present exemplary embodiment, a distance between the first stopper (217) and the second mover (300) to an optical axis direction may be different from a distance between the second stopper (218) and the second mover (300) to an optical axis direction. A distance between the first stopper (217) and the second mover (300) to an optical axis direction may be shorter than a distance between the second stopper (218) and the second mover (300) to an optical axis direction. A distance between the first stopper (217) and the second mover (300) to an optical axis direction may be longer than a distance between the second stopper (218) and the second mover (300) to an optical axis direction. That is, a movement limitation distance of first stopper (217) may be different from a movement limitation distance of second stopper (218), through which, when the bobbin (210) is moved, any one of the first stopper (217) and the second stopper (218) may be first hit and the remaining one may be hit later, whereby a shock generated from the first stopper (217) and the second stopper (218) can be dispersed. As a result, the first stopper (217) and the second stopper (218) can be prevented from being damaged.

In the present exemplary embodiment, a distance between the first stopper (217) and the housing (310) to an optical axis direction may be shorter than a distance between the second stopper (218) and the driving magnet (320) to an optical axis direction. As a result, when the bobbin (210) is downwardly moved, the first stopper (217) of bobbin (210) may first hit the housing (310), and the second stopper (218) may hit the driving magnet (320) later, through which the driving magnet (320) may be prevented from being disengaged from the housing (310) because a force of the second stopper (218) hitting the driving magnet (320) can be lessened. For example, a distance between the first stopper (217) and the housing (310) to an optical axis direction may be 125 µm~135 µm, and a distance between the second stopper (218) and the driving magnet (320) to an optical axis direction may be 135 µm~145 µm. Furthermore, a distance between the first stopper (217) and the housing (310) to an optical axis direction may be 130 µm, and a distance between the second stopper (218) and the driving magnet (320) to an optical axis direction may be 140 µm.

In the present exemplary embodiment, the first stopper (217) may be disposed on a side of corner part of housing (310), and the second stopper (218) may be disposed on a side of lateral part of housing (310). The first stopper (217) may be respectively disposed on a side of second corner part (306) and a side of fourth corner part (308). That is, two first stoppers (217) may be disposed. The first stopper (217) may be formed only on an area where the sensing magnet (730) and the compensation magnet (740) are not disposed. In other words, two corner parts of four corner parts of bobbin (210) may be formed with the first stopper (217), and the remaining two corner parts may be formed with the sensing magnet (730) and the compensation magnet (740). The second stopper (218) may be respectively disposed on first to fourth lateral parts (301, 302, 303, 304). That is, the second stopper (218) may be formed in the number of four (4).

In a modification, the first stopper (217) may be disposed on a side of lateral part of housing (310), and the second stopper (218) may be disposed on a side of corner part of housing (310). The lower surface of first stopper (217) may be overlapped with an upper surface of a protruding part of housing (310) to an optical axis direction, through this structure of which, when the bobbin (210) is downwardly moved, the lower surface of first stopper (217) at the bobbin (210) may be brought into contact with an upper surface of the protruding part. The upper surface of protruding part of housing (310) may include a groove disposed on an area corresponding to an outer distal end or a lower surface of first stopper (217).

In the present exemplary embodiment, the moment load generated from the first stopper (217) may be reduced because a groove is disposed on an area corresponding to an outer distal end or a lower surface of first stopper (217).

Alternatively, through this structure, the possibility of generating foreign objects can be lowered because a contact area can be reduced by the groove disposed on an upper surface of protruding part of the housing (310) when the first stopper (217) and the upper surface of the protruding part at the housing (310) are mutually contacted. Alternatively, the phenomenon of cracks being generated from the first stopper (217) can be minimized. To be more specific, when no groove is formed on the protrude of housing (310), the outer distal end of first stopper (217) may hit the protruding part of housing (310), and when a groove is formed, the outer distal end of first stopper (217) is prevented from hitting the protruding part of housing (310) and instead, an inner side deeper than the outer distal end of first stopper (217) may hit the protruding part of the housing (310). When the said two cases are compared, it can be noted that the moment load is less generated when there is formed with a groove because the moment load becomes greater when a shock is generated on an outside of the first stopper (217).

The second stopper (218) may include a body part (2181) and a protruding part (2182). The second stopper (218) may include a body part (2181) protruded from an outer surface of bobbin (210) to a direction perpendicular to the optical axis and a protruding part (2182) protruded from a lower surface of body part (2181) to an optical axis direction. However, the said structure may be also explained by an explanation where a groove is formed on a lower surface of body part (2181). The protruding part (2182) may be overlapped with the driving magnet (320) to an optical axis direction. The protruding part (2182) may include an area where a distance from an outer surface of bobbin (210) to an outer surface of protruding part (2182) to a direction perpendicular to an optical axis is shorter than distance from an outer surface of bobbin (210) to an outer surface of body part (2181).

An extended length from an outside surface of bobbin (210) of the protruding part (2182) may be shorter than an extended length from an outside surface of bobbin (210) of body part (2181). The protruding part (2182) may be protruded from a lower surface of the body part (2181). That is, the protruding part (2182) may be formed at a lower side of the body part (2181).

In a modification, a groove structure of the protruding part at the housing (310) may be formed at a side of the second stopper (218). Furthermore, a protruding part (2182) structure may be formed at the first stopper (217). A lower surface of first stopper (217) may include a first groove overlapped with the second mover (300) to an optical axis direction. At this time, the first groove may correspond to an area where the protruding part (2182) is not formed on a lower surface of the body part (2181). Furthermore, a lower surface of the second stopper (218) may include a second groove overlapped with the second mover (300) to an optical axis direction. At this time, the second groove may structurally correspond to the first groove.

The present exemplary embodiment may reduce a moment load generated from the second stopper (218) by forming a protruding part (2182) shorter than the body part (2181), through which the phenomenon of cracks generated from the second stopper can be minimized. To be more specific, when there is formed only a body part (2181), an outer distal end of body part (2181) may hit the driving magnet (320), and when there is formed with a protruding part (2182), an outer distal end of the protruding part (2182) may hit the driving magnet. When two cases are compared, the moment load generated from the second stopper (218), when the protruding part (2182) is hit, may be smaller than the moment load generated from the second stopper (218) when the body part (2181) is hit.

The third stopper (219) may be formed by being protruded from an upper surface of bobbin (210). The third stopper (219) may be overlapped with the cover member (100) to an optical axis direction, the construction of which may allow the third stopper (219) to limit the moving limitation of bobbin (210). Through the said configuration, the third stopper (219) may restrict the moving limitation of bobbin (210). That is, the third stopper (219) may function as an upper stopper of bobbin (210).

In the present exemplary embodiment, an upper surface of housing (310) may be formed with a reception groove for avoiding burrs of the upper elastic member (510).

The AF driving coil (220) may be disposed on the bobbin (210). The AF driving coil (220) may be disposed at an outer periphery surface of bobbin (210). The AF driving coil (220) may be directly wound on the bobbin (210). The AF driving coil (220) may face the driving magnet (320). In this case, when a current is supplied to the AF driving coil (220) to form a magnet field about the AF driving coil (220), the AF driving coil (220) may move relative to the driving magnet (320) in response to an electromagnetic interaction between the AF driving coil (220) and the driving magnet (320). The AF driving coil (220) may electromagnetically interact with the driving magnet (320). The AF driving coil (220) may move the bobbin (210) relative to the housing (310) to an optical axis through the electromagnetic interaction with the driving magnet (320). For example, the AF driving coil (220) may be an integrally formed coil. In another example, the AF driving coil (220) may include a plurality of coils each spaced apart from the other. The AF driving coil (220) may include four (4) coils each spaced apart. At this time, the said four coils may be disposed at an outer periphery surface of the bobbin (210) in order to allow two adjacent coils to mutually form a 90°.

The AF driving coil (220) may include a pair of lead cables for power supply. At this time, the pair of lead cables of the AF driving coil (220) may be electrically connected to a fourth and sixth upper elastic units (505, 506), which are elements of the upper elastic member (510). That is, the AF driving coil (220) may receive a power through the upper elastic member (510). To be more specific, the AF driving coil (220) may receive a power sequentially through the PCB (10), the substrate (410), the support member (600) and the upper elastic member (510). Alternatively, the AF driving coil (220) may receive a power from a lower elastic member (520).

The second mover (300) may accommodate, at an inside, at least a portion of a first mover (200). The second mover (300) may move the first mover (200) or may move the first mover (200). The second mover (300) may be moved through the interaction with the stator (400). The second mover (300) may be moved for OIS function. At this time, the second mover (300) may be called an 'OIS mover'. The second mover (300) may be integrally moved with the first mover (200) for the OIS function.

The second mover (300) may include a housing (310) and a driving magnet (320). However, any one or more of the housing (310) and the driving magnet (320) may be omitted or changed from the second mover (300).

The housing (310) may be disposed at an outside of the bobbin (210). The housing (310) may accommodate, at an inside thereof, at least a portion of the bobbin (210). For example, the housing (310) may take a cubic shape. The housing (310) may include a lateral part and a corner part formed between the lateral parts. The housing (310) may include four side surfaces, and four corner parts disposed among the four side surfaces.

The housing (310) may be disposed with a driving magnet (320). For example, each of the side surfaces of housing (310) may be disposed with the driving magnet (320). In another example, each of the four corner parts of the housing (310) may be disposed with the driving magnet (320).

At least a portion of an outer periphery surface of housing (310) may take a shape corresponding to that of an inner periphery surface of cover member (100). Particularly, the outer periphery surface of housing (310) may take shape corresponding to that of an inner periphery surface of side plate (102) of cover member (100). The housing (310) may be formed with an insulation material. The housing (310) may be formed with a material different from that of the cover member (100). The housing (310) may be formed with an injection object in consideration of productivity. An outer lateral surface of housing (310) may be spaced apart from an inner lateral surface of side plate (102) at the cover member (100). The housing (310) may move for OIS driving at a discrete space between the housing (310) and the cover member (100). An upper surface of housing (310) may be coupled by the upper elastic member (510). A lower surface of housing (310) may be coupled by a lower elastic member (520).

The housing (310) may include first to fourth lateral parts (301, 302, 303, 304). The housing (310) may include first to fourth lateral parts (301, 302, 303, 304) formed among the first to fourth corner parts (305, 306, 307, 308). The first lateral part (301) and the third lateral part (303) may be mutually disposed on opposite sides. The second lateral part (302) and the fourth lateral part (304) may be mutually disposed on opposite sides. The first lateral part (301) may be adjacent to the fourth lateral part (304) and the second lateral part (302). The second lateral part (302) may be adjacent to the first lateral part (301) and the third lateral part (303). The third lateral part (303) may be adjacent to the second lateral part (302) and the fourth lateral part (304). The fourth lateral part (304) may be adjacent to the third lateral part (303) and the first lateral part (301).

The housing (310) may include the first to fourth corner parts (305, 306, 307, 308). The housing (310) may include the first to fourth corner parts (305, 306, 307, 308) formed among the first to fourth lateral parts (301, 302, 303, 304). The first corner part (305) and the third corner part (307) may be mutually oppositely formed. The second corner part (306) and the fourth corner part (308) may be mutually oppositely formed.

The housing (310) may include a through hole (311), a driving part coupling part (312) and an upper coupling part (313). The housing (310) may include a lower coupling part. The housing (310) may include an inclination groove (315). The housing (310) may include a damper groove (330). The housing may include a pocket part (340). However, any one or more of the through hole (311), the driving part coupling part (312), the upper coupling part (313), the lower coupling part, the inclination groove (315), the damper groove (330) and the pocket part (340) may be omitted or changed from the housing (310). The housing (310) may further include an upper surface and an outer wall (334).

The through hole (311) may be formed on the housing (310). The through hole (311) may be formed at an inside of the housing (310). The through hole (311) may be so formed as to vertically pass through the housing (310). The through hole (311) may be formed with a bobbin (210). The through hole (311) may be movably disposed with the bobbin (210). The through hole (311) may be partially formed with a shape corresponding to that of the bobbin (210). An inner periphery surface of the housing (310) forming the through hole (311) may be spaced apart from an outer periphery surface of the bobbin (210). However, an inner surface of housing (310) forming the through hole (311) may be disposed with a stopper inwardly protruded to mechanically restrict the movement of bobbin (210) to an optical axis direction.

The driving part coupling part (312) may be coupled by a driving magnet (320). The driving part coupling part (312) may be formed on the housing (310). The driving part coupling part (312) may be formed on an inner periphery surface of the housing (310). In this case, it is advantageous for the driving magnet (320) disposed on the driving part coupling part (312) to electromagnetically interact with the AF driving coil (220) disposed on an inside of the driving magnet (320). The driving part coupling part (312) may take a bottom-opened shape. In this case, the driving magnet (320) disposed on the driving part coupling part (312) may have an advantageous electromagnetic interaction with the OIS driving coil (422) disposed at a lower side of the driving magnet (320). The driving part coupling part (312) may be formed as a groove formed by allowing an inner periphery surface of housing (310) to be outwardly recessed. At this time, the driving part coupling part (312) may be formed in a plural number. Meantime, each of the driving part coupling part (312) may be accommodated by a driving magnet (320). For example, the driving part coupling part (312) may be divided to four (4) pieces. Each of the four driving part coupling parts (312) may be disposed with a driving magnet (320). For example, the driving part coupling part (312) may be formed on a side surface of the housing (310). In another example, the driving part coupling part (312) may be formed on a corner part of the housing (310).

The upper coupling part (313) may be coupled with the upper elastic member (510). The upper coupling part (313) may be coupled with the outer part (511) of the upper elastic member (510). The upper coupling part (313) may be protrusively and upwardly formed from an upper surface of the housing (310). For example, a lug on the upper coupling part (313) may be coupled by being inserted into a groove or a hole of the outer part (511) of the upper elastic member (510). At this time, a lug of the upper coupling part (313) may be fused while being inserted into a hole of an outer part (511) to allow the upper elastic member (510) to be fixed between the fused lug and an upper surface of the housing (310).

The lower coupling part may be coupled to the lower elastic member (520). The lower coupling part may be coupled with the outer part (521) of the lower elastic member (520). The lower coupling part may be protrusively and downwardly formed from a lower surface of the housing (310). For example, a lug on the lower coupling part may be coupled by being inserted into a groove or a hole of an outer part (521) of the lower elastic member (520). At this time, a lug of the lower coupling part may be fused while being inserted into a hole of the outer part (521) to allow the lower elastic member (520) to be fixed between the fused lug and a lower surface of the housing (310).

The slant groove (315) may be formed on a portion of a lower surface of housing (310). The slant groove (315) may be formed around the through hole (333). Thus, even if the support member (600) is bent through the slant groove (315), a phenomenon of the support member (600) being contacted to the (310 can be minimized.

The damper groove (330) may be formed by allowing an area facing a lower surface of the leg part (515) of the upper elastic member (510) in an upper surface of the housing (310) to be recessed. The damper groove (330) may be disposed with a first damper (910). The damper groove (330) may form a staircase with an outer wall part (334). The damper groove (330) in the present exemplary embodiment may be infused with the first damper (910). At this time, the first damper (910) may be infused only into a second recess surface (332) of the damper groove (330). Alternatively, the first damper (910) may be infused both into the first recess surface (331) and a second recess groove surface of the damper groove (330).

The damper groove (330) may be disposed on an area facing the leg part (515) of the upper elastic member (510) in the upper surface of housing (310) and the coupling part (514). The damper groove (330) may be disposed with a first damper (910).

Figure 13:
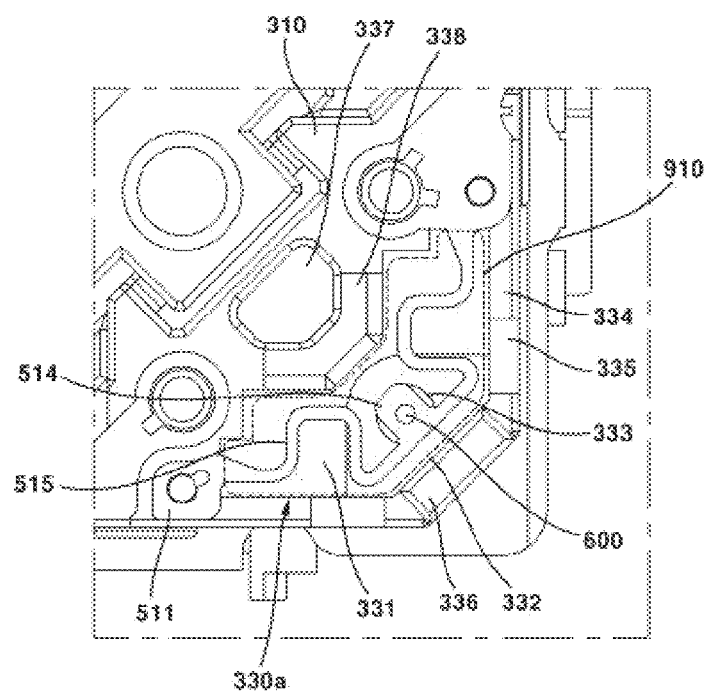
FIGS. 13, 14 and 15 are enlarged plan views of some portions of FIG. 10.

The damper groove (330) illustrated in FIG. 13 may be disposed only one wire which is one of the elements of the support member (600). The damper groove (330) may include a first groove corresponding to the leg part (515) of the upper elastic member (510) and a second groove corresponding to the coupling part (514) of the upper elastic member (510). The first groove may include a first recess surface (331), as illustrated in FIG. 13. The second groove may include a second recess surface (332), as illustrated in FIG. 13. The first groove may be connected to the second groove. A length from an upper surface of the outer wall part (334) to a floor surface (second recess surface, 332) of the second groove may be longer than that from an upper surface of the outer wall part (334) to a floor surface (first recess surface, 331) of the first groove. A portion of the outer wall part (334) of housing (310) may form a first lateral wall of the first groove and the second groove.

The damper groove (330) may further include a third groove connected to the second groove. The third groove may include a first recess surface (331), as illustrated in FIG. 13. A second groove may be disposed between the first groove and the third groove as illustrated in FIG. 13. A floor surface (first recess surface, 331) of the first groove and the floor surface (first recess surface, 331) of the third groove may be disposed on both sides of second groove. A portion of the outer wall part (334) of housing (310) may form a second lateral wall of the second groove and the third groove.

That is, a portion of the outer wall part (334) of housing (310) may include a first lateral wall and the second lateral wall of first groove, the second groove and the third groove. The first groove and the second groove may be disposed on an upper side of third groove. Meantime, any one or more of the first lateral wall and the second lateral wall may include a fourth groove (needle infused groove, 335). The fourth groove may be interposed between the first groove and the second groove, and/or between the second groove and the third groove.

Figure 14:
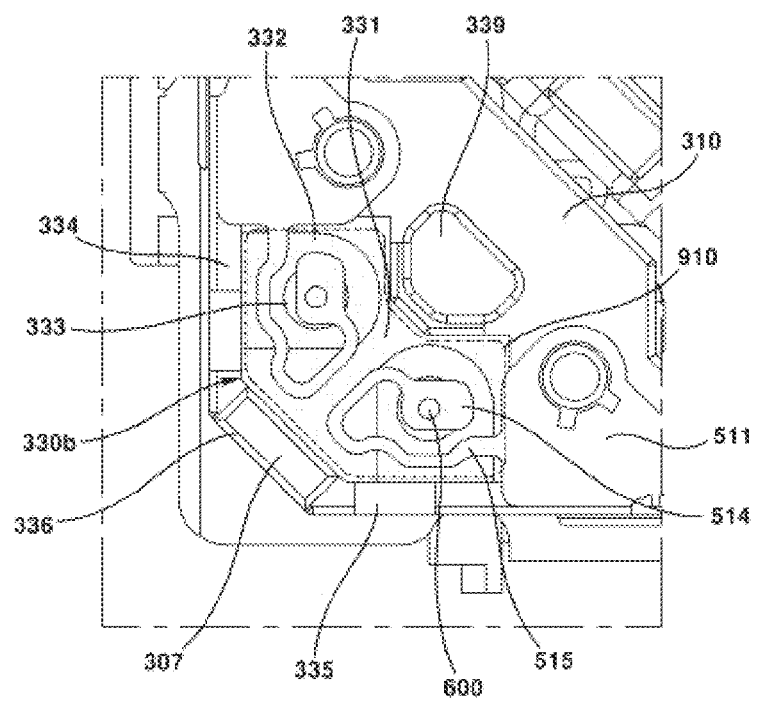
Figure 15:
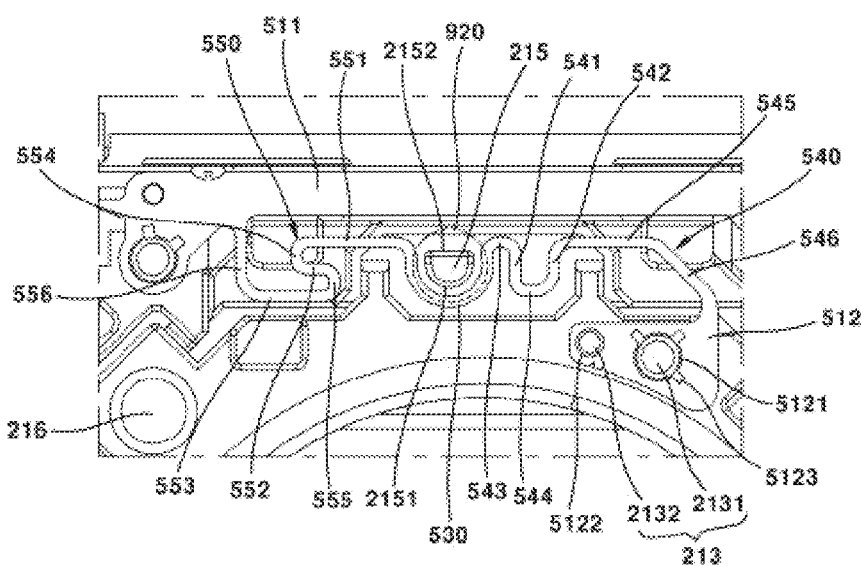

The damper groove (330) of FIG. 14 may be disposed with two wires which are elements of support member (600). The damper groove (330) may include a first groove disposed on the second coupling part (5022), a second groove disposed on the third coupling part (5023) and a third groove interposed between the first groove and the second groove. A portion of the outer wall part (334) of housing (310) may form the first lateral wall of the first groove and the second groove and the second lateral wall of the second groove and the third groove. That is, the outer wall part (334) may include the first lateral wall and the second lateral wall so formed as to wrap the first groove, the second groove and the third groove.

A distance between the cover member (100) and an upper stopper of the housing (310) in the present exemplary embodiment may be 80 μm. At this time, a distance between the leg part (515) of the upper elastic member (510) and the first recess surface (331) of the housing (310) may be 200 μm. Furthermore, a distance between the cover member (100) and the upper stopper of housing (310) may be 70 μm~90 μm. At this time, a distance between the leg part (515) of the upper elastic member (510) and the first recess surface (331) of the housing (310) may be 190 μm~210 μm. A distance between the leg part (515) of the upper elastic member (510) and the first recess surface (331) of the housing (310) may be longer by 1.5~4 times than a distance between the cover member (100) and the upper stopper of housing (310). A distance between the leg part (515) of the upper elastic member (510) and the first recess surface (331) of the housing (310) may be longer by 2~3 times than a distance between the cover member (100) and the upper stopper of housing (310). A distance between the leg part (515) of the upper elastic member (510) and the first recess surface (331) of the housing (310) may be longer by 2.5 times than a distance between the cover member (100) and the upper stopper of housing (310).

The damper groove (330) may include a first damper groove (330a) and a second damper groove (330b). The first damper groove (330a) may be respectively formed on the first corner part (305) and the third corner part (307). The second damper groove (330b) may be respectively formed on the second corner part (306) and the fourth corner part (308).

The damper groove (330) may include a first recess surface (331), a second recess surface (332), a through hole (333), an outer wall part (334), a needle infuse groove (335), a first protruding part (336), a second protruding part (337), a third protruding part (338) and a fourth protruding part (339). However, any one or more of the first recess surface (331), the second recess surface (332), the through hole (333), the outer wall part (334), the needle infuse groove (335), the first protruding part (336), the second protruding part (337), the third protruding part (338) and the fourth protruding part (339) may be omitted or changed from the damper groove (330).

The first recess surface (331) may be formed on a lower side of an upper surface of housing by being recessed from an upper surface of housing (310). The second recess surface (332) may be formed at a lower side of first recess surface (331) by being recessed from the first recess surface (331). The through hole (333) may pass through the second recess surface (332). The support member (600) may pass through the through hole (333). The outer wall part (334) may be formed by allowing an upper surface of housing (310) to be extended along an outer circumference of the housing (310). The outer wall part (334) may form a staircase with the damper groove (330).

The needle infuse groove (335) may be formed by allowing a portion of the outer wall part (334) to be recessed. A needle for infusing the first damper (910) may pass through the needle infuse groove (335).

The first protruding part (336) may be formed by being protruded from an outer distal end of the corner part of housing (310) to an upper surface of the outer wall part (334). The first protruding part (336) may prevent the first damper (910) from overflowing to an outside. When a height of the first protruding part (336) is same as or higher than that of the second protruding part (337), the first protruding part (336) may function as an upper stopper of housing (310).

The second protruding part (337) may be protruded from an upper surface of housing (310). The second protruding part (337) may be formed between the first damper groove (330a) and the through hole (311). The second protruding part (337) may function as an upper stopper restricting an upper limit of movable distance of the housing (310). That is, when the housing (310) moves upwards, the second protruding part (337) may restrict an additional movement by being hit to an upper plate (101) of cover member (100). An upper surface of second protruding part (337) may be formed at an area upper than an upper surface of the third protruding part (338).

The third protruding part (338) may be protruded from an upper surface of housing (310). The third protruding part (338) may be formed between the first damper groove (330a) and the second protruding part (337). An upper surface of third protruding part (338) may be formed at an area lower than an upper surface of the second protruding part (337). That is, the third protruding part (338) and the second protruding part (337) may form a staircase. Through the staircase structure, the first damper (910) accommodated into the first damper groove (330a) may be prevented from a phenomenon of being introduced up to an upper surface of the second protruding part (337).

The housing (310) in the present exemplary embodiment may have a 4-step staircase structure on an upper surface of housing (310). The second recess surface (332) may form a staircase with the first recess surface (331). The first recess surface (331) may form a staircase with the upper surface of housing (310). The upper surface of housing (310) may form a staircase with an upper surface of the third protruding part (338). An upper surface of the third protruding part (338) may form a staircase with an upper surface of the second protruding part (337).

The fourth protruding part (339) may be protruded from the first recess surface (331) of the second damper groove (330b). The fourth protruding part (339) may be interposed between the second recess surface (332) of the second damper groove (330b) and the through hole (311). A height of an upper surface of the fourth protruding part (339) may correspond with a height of an upper surface of the second protruding part (337). That is, the fourth protruding part (339) may function as an upper stopper restricting an upper limit of movable distance of housing (310).

The pocket part (340) may be formed by allowing an overlapped area with a coupling member coupling a board (720) and an upper elastic member (510) on the upper surface of housing (310) to an optical axis direction to be recessed. The pocket part (340) may be accommodated by at least a portion of the board (720). The pocket part (340) may be formed between an inner wall part (341) and an outer wall part (342) of housing (310). The pocket part (340) may be formed with a width corresponding to that of the board (720). Alternatively, the width of the pocket part (340) may be greater than that of the board (720). The board (720) may be inserted into the pocket part (340).

In the present exemplary embodiment, a solder cream is applied to a coupled part in order to couple the board (720) and the upper elastic member (510), a hot air is applied to an upper side to perform a soldering process. In this process, even if flux is generated from the solder cream, the flux may be downwardly scattered and is resultantly received by the pocket part (340). That is, the pocket part (340) may function as a trap collecting solder balls. In the present exemplary embodiment, defects generated by solder balls can be minimized because the flux is not scattered to all directions.

In the present exemplary embodiment, the pocket part (340) may be accommodated by adhesive (bond) in order to couple the board (720) and the housing (310). Through this structure, the adhesive may not be overflowed when an adhesive is coated in order to couple the board (720) and the housing (310).

In the present exemplary embodiment, an adhesive (bond) may be coated on a soldered area and an upper side of pocket part (430) after the board (720) and the upper elastic member (510) are soldered. Through this structure, the phenomenon of the solder balls collected by the pocket part (430) being escaped to an outside can be prevented.

The pocket part (340) may be disposed with a board (720). At this time, a portion of the board (340) may be accommodated into the pocket part (340) in order for only a terminal part of the board (720) to be protruded from an upper surface of housing (310).

The pocket part (340) may be overlapped with a coupling member to an optical axis direction. Through the said structure, the pocket part (340) may accommodate the downwardly dropping coupling member into the pocket part (340). The coupling member may include a solder. At least a portion of solder may be accommodated into the pocket part (340). An upper side of solder may be coated with an adhesive. The pocket part (340) may accommodate at least a portion of an adhesive coupling the board (720) and the housing (310).

The pocket part (340) may include a first pocket part and a second pocket part disposed downward of the first pocket part. At this time, an opening of the first pocket part may be disposed on an upper surface of housing (310). A major axis length of first pocket part may be longer than that of the second pocket part. At this time, a major axis direction in the major axis length may be a direction diagonally connecting two adjacent lateral parts of the housing (310) to a horizontal direction. By the said characteristics, a first floor surface (343) may be formed in parallel with a border between the first pocket part and the second pocket part.

The first pocket part may include a first wall (inner wall part, 341) and a second wall (outer wall part, 342) each facing the other, a third wall and a fourth wall disposed between the first wall and the second wall, each facing the other, a first floor surface (343) and an opening. Through the said structure, the first pocket part may be formed by an upper-opened groove. The second pocket part may include a first wall (inner wall part, 341) and a second wall (outer wall part, 342) each facing the other, a fifth wall and a sixth wall disposed between the first wall and the second wall, each facing the other, a second floor surface (344) and an opening. The opening of the second pocket part may be disposed on a floor surface of the first pocket part. However, as a modification, the second pocket part may include a fifth wall and a sixth wall, each facing the other, a seventh wall and an eighth wall disposed between the fifth wall and the sixth wall, each facing the other, a second floor surface (344) and an opening.

A major axis length of the second pocket part may be 50~80% of a major axis length of the first pocket part. Furthermore, A major axis length of the second pocket part may be 60~70% of a major axis length of the first pocket part. A depth to an optical axis direction of the second pocket part may correspond to a depth of the first pocket part to the optical axis direction. A depth to an optical axis direction of the second pocket part may be 110~150% of a depth of the first pocket part to the optical axis direction. A depth to an optical axis direction of the second pocket part may be 120~140% of a depth of the first pocket part to the optical axis direction. A width to a major axis direction of second pocket part and a direction perpendicular to an optical axis direction may correspond to a width of the first pocket part. A width of second pocket part may be 70~130% of that of the first pocket part. A width of second pocket part may be 90~110% of that of the first pocket part. The second pocket part and the first pocket part may be connected. The second pocket part may be disposed underneath the first pocket part. The second pocket part may be disposed underneath a center of the first pocket part.

The pocket part (340) may include a first floor surface (343) and a second floor surface (344). The pocket part (340) may further include an inner wall part (341) and a second wall part (342) wrapping the first floor surface (343) and the second floor surface (344). The inner wall part (342) of pocket part (340) may further include a sensor reception groove (345). A floor surface of the sensor reception groove (345) may become a sensor support surface (346). The outer wall part (342) of pocket part (340) may include a first groove (347) and/or a second groove (348). However, any one or more of the inner wall part (341), the outer wall part (342), the first floor surface (343), the second floor surface (344), the sensor reception groove (345), the sensor support surface (346), the first groove (347) and the second groove (348) may be omitted or changed from the pocket part (340).

Hereinafter, the inner wall part (341) may be called a 'first wall', and the outer wall part (342) may be called a 'second wall'. The pocket part (340) may include a first wall and a second wall. At this time, the board (720) may be coupled with the first wall and may be spaced apart from the second wall. The first wall may be disposed to be nearer to an optical axis than to the second wall. A thickness of the first wall may correspond to that of a sensor (710). A thickness of first wall may be thicker than that of the sensor (710). A thickness of first wall may be thinner than that of the sensor (710). The second wall may include a first groove (347) and a second groove (348). In the present exemplary embodiment, the board (720) may be disposed on an outside of the first wall (inner wall part, 341). However, as a modification, the board (720) may be disposed on an inner surface of first wall. In this case, the board (720) is disposed on an outside of the pocket part (340). However, even in this case, the pocket part (340) may function as a groove for collecting the solder balls. Furthermore, the pocket part (340) may be disposed on an upper surface of the inner wall part (341). At this time, the pocket part (340) may be so formed as to correspond to at least a portion of the upper elastic member (510) in terms of shape. A depth of the pocket part (340) to an optical axis direction may be also formed to correspond to that of the upper elastic member (510). In this case, lots of solder balls connecting the board (720) and the upper elastic member (510) may be disposed on an upper surface of the upper elastic member (510), and only a small quantity of solder balls may be introduced between the pocket part (340) and the upper elastic member (510).

The pocket part (340) may be disposed between the inner wall part (341) and the outer wall part (342). The inner wall part (341) may be supported by an inner surface of board (720). The outer wall part (342) may be spaced apart from the board (720). The first floor surface (343) may be formed at a side lower than an upper surface of housing (310). The first floor surface (343) may be formed on both sides of second floor surface (344). The second floor surface (344) may be formed at a side lower than the first floor surface (343). The first floor surface (343) may be contacted by a lower surface of board (720). The second floor surface (344) may be spaced apart from a lower surface of board (720). A staircase space formed by the first floor surface (343) and the second floor surface (344) may be accommodated by at least an adhesive that attaches the board (720) and the housing (310).

The sensor reception groove (345) may be formed by allowing a portion of an upper surface of the inner wall part (341) to be recessed. The sensor reception groove (345) may accommodate at least a portion of the first sensor (710). The sensor reception groove (345) may include a sensor support surface (346) supporting a lower surface of the first sensor (710). The sensor support surface (346) may support a lower surface of first sensor (710). Through the said structure, the first sensor (710) can be accurately assembled on a regular fixed position on a z axis in the assembly process.

The first groove (347) and the second groove (348) may be formed by allow a portion of an inner surface of the outer wall part (342) to be recessed. The first groove (347) and the second groove (348) may be mutually spaced apart. The first groove (347) and the second groove (348) may mutually take a corresponding shape. The first groove (347) and the second groove (348) may be accommodated by solder balls and/or adhesive. Furthermore, the groove structure of the first groove (347) and the second groove (348) can minimize the phenomenon of the solder balls and/or adhesive collected by the pocket part (430) from being discharged to an outside of the pocket part (430).

The driving magnet (320) may be disposed on the housing (310). The driving magnet (320) may be disposed at an outside of the AF driving coil (220). The driving magnet (320) may face the AF driving coil (220). The driving magnet (320) may electromagnetically interact with the AF driving coil (220). The driving magnet (320) may be disposed at an upper side of the OIS driving coil (422). The driving magnet (320) may face the OIS driving coil (422). The driving magnet (320) may electromagnetically interact with the OIS driving coil (422). The driving magnet (320) may be commonly used for AF focus function and the OIS function. However, the driving magnet (320) may include a plurality of magnets separately and respectively used for AF function and the OIS function. For example, the driving magnet (320) may be disposed on a lateral part of housing (310). At this time, the driving magnet (320) may be a flat-plated magnet. The driving magnet (320) may take a flat plate shape. In another example, the driving magnet (320)

may be disposed on a corner part of housing (310). At this time, the driving magnet (320) may be a corner magnet. The driving magnet (320) may take a cubic shape having an inner side surface broader than an outer side surface.

The driving magnet (320) may include a plurality of magnets, each mutually spaced apart from the other. The driving magnet (320) may include four (4) magnets, each mutually spaced apart from the other. At this time, the said four magnets may be disposed on the housing (310) to allow two adjacent magnets to form a 90°. That is, the driving magnet (320) may be disposed on four side surfaces of housing (310), each at an equi-distance. In this case, an efficient inner volume use of the housing (310) can be promoted. Furthermore, the driving magnet (320) may be attached to the housing (310) by an adhesive.

The driving magnet (320) in the present exemplary embodiment may be attached to the housing (310) by an adhesive. At this time, the housing (310) may include an adhesive infuse hole formed through the housing (310). When an adhesive is infused into the adhesive infuse hole, an adhesive may be infused between the driving magnet (320) and the housing (310), between the driving magnet (320) and a yoke (750), and between the yoke (750) and the housing (310).

The stator (400) may be disposed on a lower side of housing (310). The stator (400) may be disposed at a lower side of second mover (300). The stator (400) may face the second mover (300). The stator (400) may movably support the second mover (300). The stator (400) may move the second mover (300). At this time, the first mover (200) may also move along with the second mover (300).

The stator (400) may include a board (410), a circuit member (420) and a base (430). However, any one or more of the board (410), the circuit member (420) and the base (430) may be omitted or changed from the stator (400).

The board (410) may supply a power to the OIS driving coil (422). The board (410) may be coupled with the circuit member (420). The board (410) may be coupled with a PCB disposed at a lower side of base (430). The board (410) may be disposed at a lower surface of circuit member (420). The board (410) may be disposed on an upper surface of base (430). The board (410) may be interposed between the circuit member (420) and the base (430). The board (410) may include a circuit member (420) having an OIS driving coil (422) so disposed as to face the driving magnet (320) between the housing (310) and the base (430).

The board (410) may include an FPCB (Flexible Printed Circuit Board). The board (410) may be partially bent. The board (410) may supply a power to the AF driving coil (220). For example, the board (410) may supply a power to the AF driving coil (220) through the support member (600) and the upper elastic member (510). Furthermore, the board (410) may supply a power to a board (720) of a first sensing unit (700) through the support member (600) and the upper elastic member (510). The power supplied to the board (720) may be used for driving of the first sensor (710).

The board (410) may include an opening (411), a terminal part (412) and a reinforcement part (413). However, any one or more of the opening (411), the terminal part (412) and the reinforcement part (413) may be omitted or changed from the board (410).

The opening (411) may be formed on the board (410). The opening (411) may be formed at a center of board (410). The opening (411) may be formed to pass through the board (410). The opening (411) may pass through a light having passed through a lens module. The opening (411) may be formed with a round shape. However, the shape of the opening (411) is not limited thereto.

The terminal part (412) may be formed on a board (410). The terminal part (412) may be formed by allowing a portion of the board (410) to be downwardly bent. At least a portion of the terminal part (412) may be outwardly exposed. The terminal part (412) may be coupled with the PCB disposed at a lower side of base (430) by the soldering. A lower end of terminal part (412) may directly contact the PCB. The terminal part (412) may be disposed at an outside of base (430). The terminal part (412) may be disposed on a terminal coupling part (434) of base (430).

The terminal part (412) may include a first terminal part (412a) and a second terminal part (412b). The terminal part (412) may include a first terminal part (412a) disposed at an outer one side of base (430) and a second terminal part (412b) disposed at an opposite side of the said outer one side of the base (430). The first terminal part (412a) may be interposed between a first lug (441) and a second lug (442). The second terminal part (412b) may be interposed between a third lug (443) and a fourth lug (444).

The reinforcement part (413) may be formed to reinforce the strength of a corner part at the board (410). At this time, the circuit member (420) may be omitted from the corner part. Alternatively, as a modification, the reinforcement part (413) may be omitted and the circuit member (420) may be extended to the corner part. At this time, the circuit member (420) may include a through hole passed through by the support member (600). The reinforcement part (413) may be formed by a PSR (Photo Image-able Solder Resist) coating. The reinforcement part (413) may function as a stiffener. The reinforcement part (413) may be formed by immutable ink.

The circuit member (420) may be disposed on the base (430). The circuit member (420) may be disposed on the board (410). The circuit member (420) may be disposed on an upper surface of board (410). The circuit member (420) may be disposed at a lower side of driving magnet (320). The circuit member (420) may be interposed between the driving magnet (320) and the base (430). The circuit member (420) may be coupled by the support member (600). The circuit member (420) may movably support the second mover (300).

The circuit member (420) may include a board part (421) and an OIS driving coil (422). However, any one or more of the board part (421) and the OIS driving coil (422) may be omitted or changed from the circuit member (420).

The board part (421) may be a circuit board. The board part (421) may be an FPCB. The board part (421) may be integrally formed with the OIS driving coil (422). The board part (421) may be coupled by a support member (600). The board part (421) may be formed with a hole passed through by the support member (600). A lower surface of board part (421) and a lower end of the support member (600) may be coupled by a soldering. The board part (421) may be formed with an opening. The board part (421) may be formed with an opening passing through the board part (421). The opening of the board part (421) may be so formed as to correspond to the opening (411) of board (410).

The OIS driving coil (422) may face the driving magnet (320). In this case, when a current is supplied to the OIS driving coil (422) to form a magnetic field about the OIS driving coil (422), the driving magnet (320) may be moved to the OIS driving coil (422) through an electromagnetic interaction between the OIS driving coil (422) and the driving magnet (320). The OIS driving coil (422) may electromagnetically interact with the driving magnet (320).

The OIS driving coil (422) may move the housing (310) and the bobbin (210) relative to the base (430) to a direction perpendicular to an optical axis through an electromagnetic interaction with the driving magnet (320). The OIS driving coil (422) may include at least a coil. The OIS driving coil (422) may be an FP (Fine Pattern) coil integrally formed at the board part (421). The OIS driving coil (422) may include a plurality of coils, each mutually spaced apart from the other. The OIS driving coil (422) may include four (4) coils each mutually spaced apart. At this time, the four coils may be disposed on the board part (421) in order to allow two adjacent coils to mutually form a 90°. Meantime, each of the four coils may be separately controlled. The OIS driving coil (422) may receive a power sequentially through the PCB, the board (410) and the board part (421).

The base (430) may be disposed at a lower side of housing (310). The base (430) may be interposed between the PCB and the housing (310). The base (430) may be disposed at a lower surface of board (410). An upper surface of base (430) may be disposed with a board (410). The base (430) may be disposed with a circuit member (420). The base (430) may be coupled with the cover member (100). The base (430) may be disposed at an upper surface of PCB. However, a separate holder member may be disposed between the base (430) and the PCB. The base (430) may function as a sensor holder protecting an image sensor mounted on the PCB.

The base (430) in the present exemplary embodiment may be directly active-aligned to an upper surface of PCB. That is, an optical axis matching between a lens driving device and an image sensor may be performed in the course of attaching the base (430) to the PCB.

The base (430) may include a through hole (431), a foreign object collection part (432), a sensor coupling part (433), a terminal coupling part (434), a staircase part (435), an opening (436), a filter coupling surface (437), a gas exhaust groove (438) and an element reception groove (439). The base (430) may include a first lug (441), a second lug (442), a third lug (443), a fourth lug (444) and a protruding part (445). However, any one or more of the through hole (431), the foreign object collection part (432), the sensor coupling part (433), the terminal coupling part (434), the staircase part (435), the opening (436), the filter coupling surface (437), the gas exhaust groove (438), the element reception groove (439), the first lug (441), the second lug (442), the third lug (443), the fourth lug (444) and the protruding part (445) may be omitted or changed from the base (430).

The through hole (431) may be formed on the base (430). The through hole (431) may be so formed as to vertically pass through the base (430). The through hole (431) may be disposed with an infrared filter. However, the infrared filter may be coupled to a separate holder member disposed at a lower surface of base (430). A light having passed the lens module through the through hole (431) may be incident on the image sensor. That is, the light having passed the lens module may be incident on the image sensor through the opening of the circuit member (420) the opening (411) of board (410) and the through hole (431) of base (430). The through hole (431) may take a round shape. However, the shape of the through hole (431) is not limited thereto.

The foreign object collection part (432) may collect foreign objects introduced into the lens driving device. The foreign object collection part (432) may include a groove formed by allowing an upper surface of base (430) to be downwardly recessed, and an adhesive part disposed on the groove. The adhesive part may include an adhesive material. The foreign objects introduced into the lens driving device may be adhered to the adhesive part.

The sensor coupling part (433) may be disposed with a second sensor (800). The sensor coupling part (433) may accommodate at least a portion of the second sensor (800). The sensor coupling part (433) may be formed with a groove formed by allowing an upper surface of base (430) to be downwardly recessed. The sensor coupling part (433) may be spaced apart from the foreign object collection part (432). The sensor coupling part (433) may be formed with a plurality of grooves. For example, the sensor coupling part (433) may be formed by two grooves At this time, each of the two grooves may be disposed with the second sensor (800).

The terminal coupling part (434) may be disposed with a terminal part (412) of board (410). The terminal coupling part (434) may be formed with a groove formed by allowing a portion of a side surface of base (430) to be recessed. At this time, the terminal coupling part (434) may be accommodated by at least a portion of the terminal part (412) of board (410). A width of the terminal coupling part (434) may correspond to that of the terminal part (412) of the board (410). A length of the terminal coupling part (434) may correspond to that of the terminal part (412) of board (410).

The terminal part (435) may be formed at a side surface of base (430). The terminal part (435) may be protruded from an outside of base (430). The terminal part (435) may be formed by surrounding an outer periphery surface of base (430). The terminal part (435) may be formed by allowing an upper surface of a side surface of base (430) to be recessed. Alternatively, the terminal part (435) may be formed by allowing a lower surface of a side surface of base (430) to be protruded. The terminal part (435) may support a lower end of the side plate (102) of cover member (100). An upper surface of terminal part (435) may be formed lower than an upper surface of first to fourth lugs (441, 442, 443, 444).

The opening (436) may be so formed as to allow a portion coupled by the board (410) and the support member (600) to be opened. The opening (436) may be formed with a protruding part (445) protruded from the base (430) and supporting an inner surface of cover member (100). The opening (436) may include first to fourth openings (436a, 436b, 436c, 436d) formed at each of the corner part of base (430). A first support part (601) may be disposed on the first opening (436a). Second and third support parts (602, 603) may be disposed on the second opening (436b). A fourth support part (604) may be disposed on the third opening (436c). Fifth and sixth support parts (605, 606) may be disposed on the fourth opening (436d).

The first and third opening (436a, 436c) in the present exemplary embodiment may be formed with a protruding part (445). However, the second and fourth opening (436b, 436d) may not be formed with the protruding part (445) or may be formed with a portion of the protruding part (445) in an omitted shape formed on the first and third opening (436a, 436c). The first and third opening (436a, 436c) may be disposed with only one support part, whereas the second and fourth opening (436b, 436d) may be respectively disposed with two support parts. As a result, the second and fourth opening (436b, 436d) instead of first and third opening (436a, 436c) may need more space to couple the support part and the board (410). That is, the second and fourth opening (436b, 436d) may be omitted of the protruding part (445) or a portion of the protruding part (445) may be omitted.

The filter coupling surface (437) may be formed by allowing a lower surface of base (430) to be recessed. The filter coupling surface (437) may be coupled by a filter. The filter coupling surface (437) may be coupled by a portion of an upper surface of a filter using an adhesive. In the present exemplary embodiment, an additional staircase surface may be disposed between the filter coupling surface (437) and a lower surface of base (430). At this time, the staircase space formed by the staircase surface may be accommodated by a wire connecting the PCB and the image sensor.

The gas exhaust groove (438) may be recessively formed on the filter coupling surface (437). The gas exhaust groove (438) may be formed in a plural number. A gas may be exhausted through the gas exhaust groove (438). The gases generated in the course of coupling the PCB to the image sensor and in the course of coupling the PCB to the base (430) may be exhausted through the gas exhaust groove (438).

The element reception groove (439) may be formed by allowing a portion of a lower surface of base (430) to be recessed. The element reception groove (439) may be formed on an outside of the filter coupling surface (437) by being spaced apart from the filter coupling surface (437). The element reception groove (439) may be formed in a plural number. The element reception groove (439) may be formed with four (4) pieces. The element reception groove (439) may provide a space for receiving elements mounted on an upper surface of PCB.

The first lug (441) and the second lug (442) may be mutually spaced apart. The first lug (441) may be protruded from an outside of base (430). The first lug (441) may be spaced apart from the second lug (442). The first lug (441) may support a recessed surface (121) and a first connection surface. The first lug (441) may contact the recessed surface (121) and the first connection surface. The first lug (441) may include an upper surface contacting the recessed surface (121). The first lug (441) may include a first side surface contacting the first connection surface of recessed part (120). The first lug (441) may include a third side surface contacting a side surface of terminal part (412). However, the third side surface of the first lug (441) may be spaced apart from a side surface of the terminal part (412) by not contacting the side surface of the terminal part (412). A third side surface of first lug (441) may face a side surface of the terminal part (412). The first lug (441) may be interposed between a side surface of a first terminal part (412*a*) and a first connection surface of a first recessed part (120*a*).

The second lug (442) may be protruded from an outside of base (430). The second lug (442) may be spaced apart from the first lug (441). The second lug (442) may support a recessed surface (121) and a second connection surface. The second lug (442) may be brought into contact with the recessed surface (121) and the second connection surface. The second lug (442) may include an upper surface contacting the recessed surface (121). The second lug (442) may include a second side surface contacting the connection surface of the recessed surface (120). The second lug (442) may include a fourth side surface contacting a side surface of terminal part (412). However, the fourth side surface of the second lug (442) may be spaced apart from the side surface of terminal part (412) by not contacting the side surface of the terminal part (412). The fourth side surface of second lug (442) may face a side surface of terminal part (412). The second lug (442) may be interposed between a side surface of first terminal part (412*a*) and a second connection surface of first recessed part (120*a*).

In the present exemplary embodiment, the first lug (441) and the second lug (442) may be press-fitted to the recessed part (120) of cover member (100). That is, a distance between the first connection surface and the second connection surface may correspond to a distance between a first side surface of the first lug (441) and a second side surface of second lug (442). Alternatively, a distance between the first connection surface and the second connection surface may be smaller by a predetermined size than a distance between the first side surface of first lug and the second side surface of second lug (442).

In the present exemplary embodiment, the terminal part (412) of board (410) may be interposed between the first lug (441) and the second lug (442). At this time, a distance of an outside of terminal part (412) to a horizontal direction may correspond to a distance between a third side surface of first lug (441) and a fourth side surface of second lug (442). However, a distance of an outside of the terminal part (412) to a horizontal direction may be smaller than a distance between a third side surface of first lug and a fourth side surface of second lug (442).

The third lug (443) may be interposed between a side surface of second terminal part (412*b*) and a first connection surface of second recessed part (120*b*). The third lug (443) and the fourth lug (444) may be mutually spaced apart. The third lug (443) may be protruded from an outside of base (430). The third lug (443) may be spaced apart from the fourth lug (444).

The fourth lug (444) may be interposed between a side surface of second terminal part (412*b*) and a connection surface of second recessed part (120*b*). The fourth lug (444) may be protruded from an outside of base (430). The fourth lug (444) may be spaced apart from the third lug (443).

The third and fourth lug (443, 444) in the present exemplary embodiment may be symmetrical with the first and second lug (441, 442). The third and fourth lug (443, 444) may be formed to be opposite to the first and second lug (441, 442). The third and fourth lug (443, 444) may take a shape corresponding to that of the first and second lug (441, 442). In the present exemplary embodiment, rotation of cover member (100) may be prevented by the support member (100) being supported by the first to fourth lug (441, 442, 443, 444). However, even if the third and fourth lug (443, 444) are omitted, the rotation of cover member (1000) may be prevented by the first and second lug (441, 442). Likewise, even if the first and second lug (441, 442) are omitted, the rotation of cover member (100) may be prevented by the third and fourth lug (443, 444).

In the present exemplary embodiment, an upper surface of first to fourth lug (441, 442, 443, 444) may be formed to be upper than an upper surface of staircase part (435). A lower surface of first to fourth lug (441, 442, 443, 444) may be formed as a slant surface slantly connecting an outside of first to fourth lug (441, 442, 443, 444) and an outside of base (430).

The protruding part (445) may be formed by being protruded from the base (430). The protruding part (445) may support an inner surface of cover member (100). The protruding part (445) may be formed at a side of first lug and fourth lug (441, 444).

The elastic member (500) may couple the bobbin (210) and the housing (310). The elastic member (500) may elastically support the bobbin (210). The elastic member (500) may have elasticity at a portion thereof. At this time, the elastic member (500) may be called a 'first elastic member'. The elastic member (500) may movably support the bobbin (210). The elastic member (500) may support the bobbin (210) in such a manner that the bobbin (210) can movably move to an optical axis relative to the housing (310). That is, the elastic member (500) may support the bobbin (210) for AF driving. At this time, the elastic member (500) may be called an 'AF support member'.

The elastic member (500) may include an upper elastic member (510) and a lower elastic member (520). Any one or more of the upper elastic member (510) and the lower elastic member (520) may be omitted or changed from the elastic member.

The upper elastic member (510) in the present exemplary embodiment may be coupled to the bobbin (210) and the housing (310) by fusion. The lower elastic member (520) may be coupled with bobbin (210) and the housing (310) by bonding. At this time, the bobbin (210) and the housing (310) may be first coupled by the upper elastic member (510) and the lower elastic member may be coupled later.

A lug with a diameter of smaller or greater than 0.4 mm among the lugs coupled to the elastic member (500) by being formed on the bobbin (210) and the housing (310) may be used for fusion. Furthermore, a lug with a diameter of smaller or greater than 0.26 mm among the lugs coupled to the elastic member (500) by being formed on the bobbin (210) and the housing (310) may be used for bonding. In the present exemplary embodiment, a diameter of a lug for fixation by way of fusion may be 0.30~0.50 mm. Furthermore, a diameter of a lug for fixation by way of bonding may be 0.20~0.30 mm.

The upper elastic member (510) may be disposed at an upper side of bobbin (210) to be coupled to the bobbin (210) and to the housing (310). The upper elastic member (510) may be coupled to the bobbin (210) and the housing (310). The upper elastic member (510) may be coupled to an upper surface of bobbin (210) and to an upper surface of housing (310). The upper elastic member (510) may elastically support the bobbin (210). The upper elastic member (510) may possess the elasticity at least on a portion thereof. In this case, the upper elastic member (510) may be called an 'upper elastic member'. The upper elastic member (510) may movably support the bobbin (210). The upper elastic member (510) may movably support the bobbin (210) relative to the housing (310) to an optical axis direction. The upper elastic member (510) may be formed with a leaf spring.

The upper elastic member (510) may include a plurality of elastic units, each spaced apart from the other. The upper elastic member (510) may be formed with a plurality of separate configurations. The upper elastic member (510) may be formed with six elastic units (501, 502, 503, 504, 505, 506), each spaced apart from the other. The upper elastic member (510) may include first to sixth elastic units (501, 502, 503, 504, 505, 506), each spaced apart from the other. However, any one or more of the first to sixth elastic units (501, 502, 503, 504, 505, 506) may be omitted or changed from the upper elastic member (510).

The upper elastic member (510) may include a first elastic unit (501), a second elastic unit (502), a third elastic unit (503) and a fourth elastic unit (504), each mutually spaced apart from the bobbin to be coupled with the bobbin (210). Each of the first to fourth elastic unit (501, 502, 503, 504) may include first to fourth inner lateral part (512) each coupled to the bobbin (210). The first to fourth inner lateral part (512) may include at least two or more holes (5121, 5122) respectively coupled to lug (2131, 2132) of bobbin (210). The lug (2131, 2132) of bobbin (210) may include a first lug (2131) coupled to an inner lateral part (512) and a second lug (2132). The inner lateral part (512) may include a first hole (5121) and a second hole (5122).

Hereinafter, the elastic units (501, 502, 503, 504, 505, 506) may be called 'upper elastic unit'. The board (720) may include four terminals for supplying an outside power to the first sensor (710). At this time, each of the said four terminals may be soldered and coupled to the four upper elastic unit. A modification of the present exemplary embodiment may include four pocket parts disposed at positions corresponding to four terminals. That is, in the modification, the pocket part (340) may be divided to four pieces to be disposed at positions corresponding to four terminals. The board (720) may be disposed perpendicularly to the upper elastic member (510), and the upper elastic member (510) may further include a groove part formed at an area disposed with a coupling member.

The first to sixth elastic unit (501, 502, 503, 504, 505, 506) may be mutually spaced apart. Through the said structure, the first to sixth elastic unit (501, 502, 503, 504, 505, 506) may be used as a conductive line inside the lens driving device. The first to sixth elastic unit (501, 502, 503, 504, 505, 506) may be electrically connected to the board (410) through the support member (600). The first to six elastic unit (501, 502, 503, 504) may be coupled to the board (720) of the first sensing unit (700). Through the said structure, the first to fourth elastic unit (501, 502, 503, 504) may be electrically connected to the first sensor (710). At this time, the fifth and sixth elastic unit (505, 506) may be electrically connected to the AF driving coil (220). That is, the first to sixth elastic unit (501, 502, 503, 504, 505, 506) may be used to supply a power to the first sensor (710) disposed on the housing (310) and to the AF driving coil (220). The first elastic unit (501) may be electrically connected to the first sensor (710) and to the support member (600).

The first elastic unit (501) may include a first outer lateral part (5011), a second outer lateral part (5012), a first coupling part (5013), a first leg part (5014), a second leg part (5015) and a first terminal part (5016). However, any one or more of the first outer lateral part (5011), the second outer lateral part (5012), the first coupling part (5013), the first leg part (5014), the second leg part (5015) and the first terminal part (5016) may be omitted or changed from the first elastic unit (501).

The first outer lateral part (5011) may be coupled to a lateral part of one side of housing (310). The first outer lateral part (5011) may be coupled to a fourth lateral part (304) of housing (310). The second outer lateral part (5012) may be coupled to a lateral part adjacent to the lateral part of one side of housing (310). The second outer lateral part (5012) may be coupled to a first lateral part (301) of housing (310). The first coupling part (5013) may be coupled to the support member (600). The first coupling part (5013) may be coupled with a first support part (601). The first leg part (5014) may connect the first outer part (5011) and the first coupling part (5013). The second leg part (5015) may connect the second outer part (5012) and the first coupling part (5013).

In the present exemplary embodiment, the first leg part (5014) and the second leg part (5015) may be symmetrical about a virtual plane including a first support part (601) of support member (600) and an optical axis. Through this structure, tilt generated by the support member (600) and the upper support member (510) during the driving of the lens driving device may be improved. Each of the first and second leg parts (5014, 5015) may be bent for more than twice. Each of the first and second leg parts (5014, 5015)

may be bent for more than three times. At this time, the bent shape of the first and second leg parts may be also mutually symmetrical. The first and second leg parts (5014, 5015) may be oppositely disposed about the first coupling part (5013).

The first terminal part (5016) may be extended from the second outer lateral part (5012) and may be coupled to the board (720) disposed with the first sensor (710).

The second elastic unit (502) may include a third outer part (5021), a second coupling part (5022) and a second terminal part (5023). The second elastic unit (502) may include a third outer lateral part (5021) coupled to the housing (310), a second coupling part (5022) extended from the third outer lateral part (5021) and coupled with the second support part (602) and a second terminal part (5023) extended from the third outer lateral part (5021) and coupled to the board (720) disposed with the first sensor (710).

The third elastic unit (503) may include a fourth outer lateral part (5031), a third coupling part (5032) and a third terminal part (5033). The third elastic unit (503) may include a fourth outer lateral part (5031) coupled to the housing (310), a third coupling part (5032) extended from the fourth lateral part (5031) and coupled with the third support part (603) and a third terminal part (5033) extended from the fourth outer lateral part (5031) and coupled with the board (720) disposed with the first sensor (710).

The fourth elastic unit (504) may include a fifth outer lateral part (5041), a sixth outer lateral part (5042), a fourth coupling part (5043), a third leg part (5044), a fourth leg part (5045) and a fourth terminal part (5046). However, any one or more of the fifth outer lateral part (5041), the sixth outer lateral part (5042), the fourth coupling part (5043), the third leg part (5044), the fourth leg part (5045) and the fourth terminal part (5046) may be omitted or changed from the fourth elastic unit (504).

The fifth outer lateral part (5041) may be coupled to the second lateral part (302) of housing (310). The sixth outer lateral part (5042) may be coupled to the third lateral part (303) of housing (310). The fourth coupling part (5043) may be coupled to the support member (600). The fourth coupling part (5043) may be coupled to the fourth support part (604). The third leg part (5044) may connect the fifth outer lateral part (5041) and the fourth coupling part (5043). The fourth leg part (5045) may connect the sixth outer lateral part (5042) and the fourth coupling part (5043). The fourth terminal part (5046) may be extended from the fifth outer lateral part (5041) and coupled to the board (720) disposed with the first sensor (710).

In the present exemplary embodiment, the shape of the first outer lateral part (5011) of the first elastic unit (501) may be different from the shape of the sixth outer lateral part (5042) of the fourth elastic unit (504). The first outer lateral part (5011) may be coupled with two lugs formed on the upper surface of housing (310). The sixth outer lateral part (5042) may be coupled with one lug formed on an upper surface of housing (310).

The upper elastic member (510) may include an outer part (511), an inner part (512), a connection part (513), a coupling part (514) and a leg part (515). However, any one or more of the outer part (511), the inner part (512), the connection part (513), the coupling part (514) and the leg part (515) may be omitted or changed from the upper elastic member (510).

The outer part (511) may be coupled to the housing (310). The outer part (511) may be coupled to an upper surface of housing (310). The outer part (511) may be coupled to an upper coupling part (313) of housing (310). The outer part (511) may include a hole or a groove coupled with the upper coupling part (313) of housing (310).

The inner part (512) may be coupled to the bobbin (210). The inner part (512) may be coupled to an upper surface of bobbin (210). The inner part (512) may be coupled to the upper coupling part (213) of bobbin (210). The inner part (512) may include a hole or a groove coupled to the upper coupling part (213) of bobbin (210).

In the present exemplary embodiment, the upper elastic member (510) may include four (4) inner parts (512) coupled to the bobbin (210). At this time, the said four inner parts (512) may be rotationally symmetrical about an optical axis.

The inner part (512) may include a first hole (5121), a second hole (5122) and a guide hole (5123). However, any one or more of the first hole (5121), the second hole (5122) and the guide hole (5123) may be omitted or changed from the inner part (512).

Each of the first hole (5121) and the second hole (5122) may be mutually spaced apart from the other. The first hole (5121) may be spaced apart from the second hole (5122). The first hole (5121) may be coupled by a first lug (2131) of bobbin (210). The first hole (5121) may be greater than the second hole (5122). A diameter of first hole (5121) may be greater than that of the second hole (5122). The first hole (5121) may include a plurality of groove disposed with an adhesive. The first lug (2131) may be bonded to the first hole (5121) using an adhesive.

The second hole (5122) may be spaced apart from the first hole (5121). The second hole (5122) may be accommodated by at least a portion of the second lug (2132) of bobbin (210). A diameter of second hole (5122) may be smaller than that of the first hole (5121). In the present exemplary embodiment, the inner part (512) of the upper support member (510) may be prevented from being rotated relative to the bobbin (210) by the dual coupling in which the first hole (5121) is coupled to the first lug (2131) and the second hole (5122) is coupled to the second lug (2132). The second hole (5122) may include a plurality of groove disposed with an adhesive.

The guide hole (5123) may be formed by being extended from the first hole (5121). The guide hole (5123) may be accommodated by a portion of the fused first lug (2131). Through the said structure, the rotation of inner part (512) relative to the bobbin (210) can be prevented. The guide hole (5123) may be formed with three pieces by being mutually spaced apart about the first hole (5121).

The connection part (513) may connect the outer part (511) and the inner part (512). The connection part (513) may elastically connect the outer part (511) and the inner part (512). The connection part (513) may have the elasticity. At this time, the connection part (513) may be called an 'elastic part'. The connection part (513) may be formed by being bent more than twice.

The coupling part (514) may be coupled with the support member (600). The coupling part (514) may be coupled to the support member (600) by way of soldering. For example, the coupling part (514) may include a through hole passed through by the support member (600). In another example, the coupling part (514) may include a groove coupled by the support member (600). The coupling part (514) may be extended from the outer part (511). The coupling part (514) may be extended from the outer part (511) to an outside. The coupling part (514) may include a bent part formed by being bent.

The leg part (515) may connect the outer part (511) and the coupling part (514). A lower side of leg part (515) may be disposed with a damper groove (330). The leg part (515) may be coated with a first damper (910). When the leg part (515) is coated with the first damper (910), the vertical vibration (resonance) of housing (310) may be effectively restrained.

The connection part (513) of upper elastic member (510) may include a damper disposition part (530), a first connection part (540) and a second connection part (550). However, any one or more of the damper disposition part (530), the first connection part (540) and the second connection part (550) may be omitted or changed from the connection part (513) of upper elastic member (510).

The damper disposition part (530) may be disposed with a second damper (920). The damper disposition part (530) may be coated with the second damper (920). The damper disposition part (530) may be formed with a shape corresponding to that of a curved surface (2151) of lug (215). The damper disposition part (530) may be spaced apart from the curved surface (2151) of lug (215) to be disposed at an inside of the lug (215).

The first connection part (540) may connect the damper disposition part (530) and the inner part (512). The first connection part (540) may be bent by several times. The first connection part (540) may include a first inner portion (541) and a second inner portion (542) each disposed in a parallel manner.

The first connection part (540) may include first to sixth inner portions (541, 542, 543, 544, 545, 546). At least a portion of the first inner portion (541) and the second inner portion (542) may be disposed in a mutually parallel manner. The first inner portion (541) and the second inner portion (542) may face each other between the inner part (512) and the damper disposition part (530) by being bent or curved several times. The first inner portion (541) and the second inner portion (542) may be extended to a direction different from an extended direction of the adjacently disposed outer part (511). The first inner portion (541) and the second inner portion (542) may be extended to a direction different from a lengthwise direction of the first connection part (540). The third inner portion (543) may roundly connect the damper disposition part (530) and the first inner portion (541). In a modification, the third inner portion (543) may slantly connect the damper disposition part (530) and the first inner portion (541). The fourth inner portion (544) may roundly connect the first inner portion (541) and the second inner portion (542). In a modification, the fourth inner portion (544) may slantly connect the first inner portion (541) and the second inner portion (542). The fifth inner portion (545) may be extended from the second inner portion (542). At least a portion of the fifth inner portion (545) may be disposed to a perpendicular direction of extension direction of the second inner portion (542). The six inner portion (546) may connect the fifth inner portion (545) and the inner part (512). The sixth inner portion (546) may form an obtuse angle with the fifth inner portion (545).

In the foregoing discussion, although it was explained that the first connection part (540) is divided to six separate configurations for convenience of explanation, it may be understood that the said explained two separate configurations are combined as one separate configuration, and the said explained one separate configuration is also divided into two or more separate configurations.

A first yoke (750a) may be disposed at a lower side of the first sensor (710) on the housing (310). A second yoke (750b) may be disposed at an opposite side of the first yoke (750a) on the housing (310). The first yoke (750a) may be disposed on the first corner part (305) of housing (310). The second yoke (750b) may be disposed on the second corner part (307) of housing (310). The first yoke (750a) may be disposed on the first corner part (305) of housing (310) facing the sensing magnet (730). The second yoke (750b) may be disposed on the third corner part (307) of housing (310) facing the compensation magnet (740).

The yoke (750) may include a body part (751) and an extension part (752). The body part (751) may be disposed at a lower side of board (720). The body part (751) may be disposed in parallel with an outside of the sensing magnet (730). The extension part (752) may be extended from the body part (751). The extension part (752) may be brought into contact with the driving magnet (320). The extension part (752) may be formed on both sides of body part (751). The yoke (750) may be formed with a shape to prevent the driving magnet (320) from magnetically interfering with the first sensor (710).

The second sensor (800) may be provided for OIS feedback. In this case, the second sensor (800) may be called an 'OIS feedback sensor'. The second sensor (800) may detect the movement of housing (310). The second sensor (800) may detect the movement or tilt of housing (310) and/or bobbin (210) to a direction perpendicular to an optical axis. The second sensor (800) may detect the driving magnet (320). The second sensor (800) may detect the driving magnet (320) disposed on the housing (310). The second sensor (800) may detect the position of housing (310). The second sensor (800) may detect an amount of movement of housing (310) to a direction perpendicular to an optical axis. At this time, the amount of movement of housing to a direction perpendicular to the optical axis may correspond to an amount of movement of bobbin (210) and the lens module coupled to the bobbin (210). The second sensor (800) may be disposed on the stator (400). The second sensor (800) may be disposed at a lower surface of board (410). The second sensor (800) may be electrically connected to the board (410). The second sensor (800) may be disposed on the base (430). The second sensor (800) may be accommodated into the sensor coupling part (433) formed on an upper surface of base (430). The second sensor (800) may be a Hall sensor. The second sensor (800) may be a Hall IC (Hall Integrated Circuit). The second sensor (800) may detect a magnetic power of driving magnet (320). That is, the second sensor (800) may detect magnetic changes in the magnetic power that is changed by the movement of driving magnet (320) when the housing (310) is moved, to detect the displacement quantity of housing (310). The second sensor (800) may be provided in a plural number. For example, the second sensor (800) may be provided in two pieces to detect the x axis and y axis movement (z axis is optical axis) of the housing (310).

The first damper (910) may be disposed on the support member (600). The first damper (910) may be disposed on the support member (600) and the housing (310). The second damper (920) may be disposed on the upper elastic member (510). The dampers (910, 920) may be disposed on the elastic member (500) and/or support member (600) to prevent the resonance phenomenon generated from the elastic member (500) and/or the support member (600). A shock absorber (not shown) may be provided to any one or more of the elastic member (500) and the support member (600). The shock absorber may be formed by allowing a portion of the elastic member (500) and/or the support member (600) to be changed.

The first damper (910) may be disposed on the support member (600), the coupling part (514) of upper elastic member (510), the leg part (515) of upper elastic member (510) and the housing (310). The first damper (910) may be coated on the support member (600), the coupling part (514) of upper elastic member (510), the leg part (515) of upper elastic member (510) and the housing (310). The first damper (910) may be disposed on an area occupying more than 90% of an entire area of a lower surface of leg part (515) at the upper elastic member (510). The first damper (910) may be disposed on an area occupying more than 50% of an entire area of a lower surface of leg part (515) at the upper elastic member (510). The first damper (910) may be disposed on a space formed by the second recessed surface (332) and the upper elastic member (510) and a space formed by the first recessed surface (331) and the upper elastic member (510). Alternatively, the first damper (910) may be disposed only on a space formed by the second recessed surface (332) and the upper elastic member (510). The first damper (910) may be disposed on the damper groove (330) to encompass the support member (600), the coupling part (514) and the leg part (515).

The second damper (920) may be disposed on the bobbin (210) and the upper elastic member (510). The second damper (920) may be disposed on the lug (215) of bobbin (210) and the damper disposition part (530) of upper elastic member (510).

Hereinafter, the operation of camera module according to the present exemplary embodiment will be described.

First, the AF function of camera module according to an exemplary embodiment will be explained. When a power is supplied to the AF driving coil (220), the AF driving coil (220) performs a movement relative to the driving magnet (320) through the electromagnetic interaction between the AF driving coil (220) and the driving magnet (320). At this time, the bobbin (210) coupled with the AF driving coil (220) may integrally move with the AF driving coil (220). That is, the bobbin (210) coupled with the lens module moves relative to the housing (310) to an optical axis direction. The said movement of bobbin (210) may result in the lens module closing on or distancing from the image sensor, such that the focus control can be performed relative to a subject by suppling a power to the AF driving coil (220) in the present exemplary embodiment. Meantime, the said focus control may be automatically performed in response to a distance to a subject.

Meantime, in the camera module according to the present exemplary embodiment, an AF feedback control may be performed in order to realize more accurate AF function. The first sensor (710) disposed on the housing (310) may detect a magnetic field of the sensing magnet (730) disposed on the bobbin (210). As a result, when the bobbin (210) performs a relative movement to the housing (310), the amount of magnetic field detected from the first sensor may be changed. The first sensor (710) may detect the amount of movement of bobbin to an optical axis direction or the position of bobbin (210) to transmit the detected value to the controller. The controller determines whether to perform an additional movement to the bobbin (210) using the received detection value. These types of processes are generated in real time, whereby the AF function of camera module according to the present exemplary embodiment can be more accurately performed through the AF feedback control.

Now, the OIS function of camera module according to an exemplary embodiment will be described.

When a power is supplied to the OIS driving coil (422), the driving magnet (320) performs a movement relative to the OIS driving coil (422) through the electromagnetic interaction between the OIS driving coil (422) and the driving magnet (320). At this time, the housing (310) coupled with the driving magnet (320) may integrally move along with the driving magnet (320). That is, the housing (310) moves relative to the base (430) to a horizontal direction (a direction perpendicular to an optical axis). However, at this time, tilt of housing (310) relative to the base (430) may be induced. Meantime, the bobbin (210) may integrally move with the housing (310) relative to the horizontal movement of the housing (310). As a result, the said movement of housing (310) may result in the lens module coupled to the bobbin (210) moving to a direction parallel with a direction disposed with the image sensor relative to the image sensor. That is, in the present exemplary embodiment, the OIS function can be performed by supplying a power to the OIS driving coil (422).

Meantime, an OIS feedback control may be performed in order to realize a more accurate OIS function of camera module according to the present exemplary embodiment. The second sensor (800) disposed on the base (430) may detect the magnetic field of driving magnet (320) disposed on the housing (310). As a result, when the housing (310) performs a relative movement to the base (430), an amount of magnetic field detected by the second sensor may be changed. A pair of second sensors (800) may detect the movement of housing (310) to horizontal direction (x axis and y axis direction) using the said method to transmit a detected value to the controller. The controller determines whether to perform an additional movement to the housing (310) using the received detection value. These types of processes are generated in real time, whereby the OIS function of camera module according to the present exemplary embodiment can be more accurately performed through the OIS feedback control.

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention. Furthermore, terms such as "includes", "including", "have", "having", "comprises" and/or "comprising" as used herein mean that the relevant elements are embedded, unless otherwise described, such that the mentioned elements are not excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being included in the scope of right of the present invention.

The invention claimed is:

1. A lens driving device comprising:
a base;
a housing disposed on the base;
a bobbin disposed in the housing;
a first coil disposed on the bobbin;
a first magnet disposed on the housing and facing the first coil;
a board disposed on the base and comprising a second coil configured to electromagnetically interact with the first magnet;
an upper elastic member disposed on an upper portion of the bobbin and coupled to the bobbin and the housing;
a support member electrically connecting the upper elastic member and the board; and
a damper connecting the bobbin and the upper elastic member;
a second magnet disposed on a first side of the bobbin;
a sensor configured to detect the second magnet;
a third magnet disposed on a second side of the bobbin that is opposite to the first side of the bobbin;
a first yoke disposed on a first side of the housing at a lower side of the sensor; and
a second yoke disposed on a second side of the housing that is opposite to the first side of the housing,
wherein the upper elastic member comprises an outer part coupled to the housing, an inner part coupled to the bobbin, a connection part connecting the outer part and the inner part, and a coupling part extending from the outer part and coupled with the support member,
wherein the bobbin comprises a lug protruding from an upper surface of the bobbin,
wherein the damper is disposed on the lug of the bobbin and the connection part of the upper elastic member,
wherein the first yoke comprises a body part disposed at the lower side of the sensor, and an extension part extending from the body part, and
wherein the extension part contacts the first magnet, the extension part being located on both sides of the body part.

2. The lens driving device of claim 1, wherein the connection part of the upper elastic member comprises a damper disposition part corresponding to the lug, and
wherein the damper is disposed on the lug of the bobbin and the damper disposition part of the upper elastic member.

3. The lens driving device of claim 2, wherein the damper disposition part is spaced apart from the lug.

4. The lens driving device of claim 2, wherein the connection part of the upper elastic member comprises a first connection part connecting the damper disposition part and the inner part, and a second connection part connecting the damper disposition part and the outer part, and
wherein at least any one of the first connection part and the second connection part comprises a bent shape.

5. The lens driving device of claim 1, wherein an inner side surface of the lug is formed by a curved surface, and
wherein an outer side surface of the lug is formed by a plain surface.

6. The lens driving device of claim 1, wherein at least a part of the lug of the bobbin is coated with the damper.

7. The lens driving device of claim 1, comprising a second mover comprising the housing and the first magnet,
wherein the bobbin comprises first and second stoppers overlapped with the second mover in an optical axis direction and spaced apart from each other,
wherein the housing comprises lateral parts and corner parts formed between the lateral parts,
wherein the first stopper is disposed at a side of the corner parts, the second stopper is disposed at a side of the lateral parts, and
wherein a distance between the first stopper and the second mover in the optical axis direction is different from a distance between the second stopper and the second mover in the optical axis direction.

8. The lens driving device of claim 7, wherein a distance between the first stopper and the housing in the optical axis direction is greater than a distance between the second stopper and the first magnet in the optical axis direction.

9. The lens driving device of claim 8, wherein the second stopper comprises a body part protruding from an outer peripheral surface of the bobbin in a direction perpendicular to the optical axis direction, and a protruding portion protruding from a lower surface of the body part in the optical axis direction,
wherein the protruding portion is overlapped with the first magnet in the optical axis direction, and
wherein the protruding portion comprises an area where a distance from the outer peripheral surface of the bobbin to an outer peripheral surface of the protruding portion in a direction perpendicular to the optical axis direction is shorter than a distance from the outer peripheral surface of the bobbin to an outer peripheral surface of the body part.

10. The lens driving device of claim 8, wherein a lower surface of the first stopper is overlapped with an upper surface of a protruding portion of the housing in the optical axis direction, and
wherein the upper surface of the protruding portion of the housing comprises a groove disposed at an area corresponding to an outer distal end of the first stopper.

11. The lens driving device of claim 7, wherein a distance between the first stopper and the housing in the optical axis direction is shorter than a distance between the second stopper and the first magnet in the optical axis direction.

12. The lens driving device of claim 7,
wherein the corner parts comprise, to a clockwise direction, a first corner part, a second corner part, a third corner part and a fourth corner part,
wherein the second magnet is disposed on the first corner part,
wherein the third magnet is disposed on the third corner part, and
wherein the first stopper is disposed on the second corner part and the fourth corner part.

13. The lens driving device of claim 7, wherein a lower surface of second stopper is disposed at a position upper than that of a lower surface of the first stopper, and
wherein a portion of the lower surface of the first stopper is brought into contact with the first coil.

14. A camera module, comprising:
a PCB (Printed Circuit Board);
an image sensor disposed on the PCB;
the lens driving device of claim 1 disposed on the PCB; and
a lens coupled to the bobbin of the lens driving device and disposed at a position corresponding to the image sensor.

15. The lens driving device of claim 1, wherein the first yoke is formed with a shape to prevent the first magnet from magnetically interfering with the sensor.

16. The lens driving device of claim 1, wherein the housing comprises an adhesive infuse hole formed through the housing, and
wherein an adhesive infused into the adhesive infuse hole is disposed between the first magnet and the housing, between the first magnet and each of the first and second yokes, and between the housing and each of the first and second yokes.

17. A lens driving device comprising:
a base;
a housing disposed on the base;
a bobbin disposed in the housing;
a first coil disposed on the bobbin;
a first magnet disposed on the housing;
a second coil disposed on the base;
an upper elastic member connecting the housing and the bobbin;
a damper connecting the bobbin and the upper elastic member;
a second magnet disposed on a first side of the bobbin;
a sensor configured to detect the second magnet;
a third magnet disposed on a second side of the bobbin that is opposite to the first side of the bobbin;
a first yoke disposed on a first side of the housing at a lower side of the sensor; and
a second yoke disposed on a second side of the housing that is opposite to the first side of the housing,
wherein the upper elastic member comprises an outer part coupled to the housing, an inner part coupled to the bobbin, and a connection part connecting the outer part and the inner part,
wherein the bobbin comprises a lug protruding from an upper surface of the bobbin,
wherein the damper connects the lug of the bobbin and the connection part of the upper elastic member,
wherein the first yoke comprises a body part disposed at the lower side of the sensor, and an extension part extending from the body part, and
wherein the extension part contacts the first magnet, the extension part being located on both sides of the body part.

18. The lens driving device of claim 17, wherein the connection part of the upper elastic member comprises a damper disposition part corresponding to the lug, and
wherein the damper connects the lug of the bobbin and the damper disposition part of the upper elastic member.

19. The lens driving device of claim 18, wherein the damper disposition part is spaced apart from the lug.

20. The lens driving device of claim 17, wherein an inner side surface of the lug is formed by a curved surface, and
wherein an outer side surface of the lug is formed by a plain surface.

* * * * *